(12) United States Patent
Kaner et al.

(10) Patent No.: US 10,388,466 B2
(45) Date of Patent: Aug. 20, 2019

(54) METHODS, DEVICES AND SYSTEMS FOR ACTIVATED CARBON SUPERCAPACITORS WITH MACROPOROUS ELECTRODES

(71) Applicant: The Regents of the University of California, Oakland, CA (US)

(72) Inventors: Richard B. Kaner, Pacific Palisades, CA (US); Jee Youn Hwang, Los Angeles, CA (US); Mengping Li, Los Angeles, CA (US); Maher F. El-Kady, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/848,522

(22) Filed: Dec. 20, 2017

(65) Prior Publication Data

US 2018/0182565 A1 Jun. 28, 2018

Related U.S. Application Data

(60) Provisional application No. 62/438,377, filed on Dec. 22, 2016.

(51) Int. Cl.
*H01G 11/26* (2013.01)
*H01G 11/24* (2013.01)
(Continued)

(52) U.S. Cl.
CPC ............ *H01G 11/36* (2013.01); *H01G 11/24* (2013.01); *H01G 11/28* (2013.01); *H01G 11/34* (2013.01);
(Continued)

(58) Field of Classification Search
CPC ........ H01G 11/22; H01G 11/32; H01G 11/36; H01G 11/40
See application file for complete search history.

(56) References Cited

U.S. PATENT DOCUMENTS

| 6,097,587 A * | 8/2000 | Inagawa ................ H01G 9/155 361/502 |
| 2003/0030969 A1* | 2/2003 | Farahmandi .......... H01G 9/155 361/502 |

(Continued)

FOREIGN PATENT DOCUMENTS

CN 105753112 A 7/2016

OTHER PUBLICATIONS

Ying et al., Capacitive Properties of Activated Carbon in K4Fe(CN)6, Journal of Electrochemical Society, 158 (7) A818-A821 (Year: 2011).*

(Continued)

*Primary Examiner* — Eric W Thomas
(74) *Attorney, Agent, or Firm* — Withrow & Terranova, P.L.L.C.

(57) ABSTRACT

Energy storage devices comprising carbon-based electrodes and/or redox electrolytes are disclosed herein. In some embodiments, the carbon-based electrodes comprise laser-scribed activated carbon comprising one or more microchannels. In some embodiments, the redox electrolytes comprise a ferricyanide/ferrocyanide redox couple. Also described are processes, methods, protocols and the like for manufacturing carbon-based electrodes comprising microchannels for use in high energy storage devices such as supercapacitors, and for manufacturing high energy storage devices comprising redox electrolytes.

18 Claims, 9 Drawing Sheets

(51) Int. Cl.

| | |
|---|---|
| *H01G 11/36* | (2013.01) |
| *H01G 11/28* | (2013.01) |
| *H01G 11/68* | (2013.01) |
| *H01G 11/86* | (2013.01) |
| *H01G 11/34* | (2013.01) |

(52) U.S. Cl.
CPC .............. *H01G 11/68* (2013.01); *H01G 11/86* (2013.01); *Y02E 60/13* (2013.01)

(56) References Cited

U.S. PATENT DOCUMENTS

| | | | |
|---|---|---|---|
| 2008/0013255 A1* | 1/2008 | Schneuwly | H01G 9/0029 361/502 |
| 2008/0180881 A1* | 7/2008 | Feaver | H01G 11/34 361/502 |
| 2016/0086740 A1 | 3/2016 | Li et al. | |

OTHER PUBLICATIONS

Lei, C., et al., "Phenolic carbon cloth-based electric double-layer capacitors with conductive interlayers and graphene coating," Journal of Applied Electrochemistry, vol. 46, Dec. 28, 2015, pp. 251-258.

Tiliakos, A., et al., "Laser-Scribed Graphene Electrodes for Supercapacitors: Polyimide vs. Graphene Oxide Precursors," ICTP—Workshop on Materials Science for Energy Storage 2015, Trieste, Italy, May 11-15, 2015, 1 page.

Zhou, X., et al., "The Bamboo-Like Composites of V2O5/Polyindole and Activated Carbon Cloth as Electrodes for All-Solid-State Flexible Asymmetric Supercapacitors," ACS Applied Materials & Interfaces, vol. 8, Jan. 22, 2016, pp. 3776-3783.

International Search Report and Written Opinion for International Patent Application No. PCT/US2017/067541, dated Apr. 20, 2018, 11 pages.

Burke, A., "R&D considerations for the performance and application of electrochemical capacitors," Electrochimica Acta, vol. 53, Available online Jan. 26, 2007, pp. 1083-1091.

Chen, L., et al., "Mechanism investigation and suppression of self-discharge in active electrolyte enhanced supercapacitors," Energy & Environmental Science, vol. 7, Feb. 24, 2014, pp. 1750-1759.

Chun, S.-E., et al., "Design of aqueous redox-enhanced electrochemical capacitors with high specific energies and slow self-discharge," Nature Communications, vol. 6, Aug. 4, 2015, 10 pages.

Dura, H., et al., "Cost Analysis of Supercapacitor Cell Production," Proceedings of the 2013 International Conference on Clean Electrical Power (ICCEP), Jun. 11-13, 2013, Alghero, Italy, pp. 516-523.

El-Kady, M. F., et al., "Laser Scribing of High-Performance and Flexible Graphene-Based Electrochemical Capacitors," Science, vol. 335, Issue 6074, Mar. 16, 2012, pp. 1326-1330.

El-Kady, M. F., et al., "Direct Laser Writing of Graphene Electronics," ACS Nano Technology, vol. 8, No. 9, Sep. 12, 2014, pp. 8725-8729.

El-Kady, M. F., et al., "Engineering three-dimensional hybrid supercapacitors and microsupercapacitors for high-performance integrated energy storage," Proceedings of the National Academy of Sciences of the United States of America, vol. 112, No. 14, Apr. 7, 2015, pp. 4233-4238.

El-Kady, M. F., et al., "Graphene for batteries, supercapacitors and beyond," Nature Reviews Materials, vol. 1, Published online May 24, 2016, pp. 1-14.

Fic, K., et al., "Novel insight into neutral medium as electrolyte for high-voltage supercapacitors," Energy & Environmental Science, vol. 5, Available online Dec. 20, 2011, pp. 5842-5850.

Gogotsi, Y., et al., "True Performance Metrics in Electrochemical Energy Storage," Science, vol. 334, Nov. 18, 2011, pp. 917-918.

He, M., et al., "Ageing phenomena in high-voltage aqueous supercapacitors investigated by in situ gas analysis," Energy & Environmental Science, vol. 9, Dec. 11, 2015, pp. 623-633.

Hwang, J. Y., et al., "Direct preparation and processing of graphene/RuO2 nanocomposite electrodes for high-performance capacitive energy storage," Nano Energy, vol. 18, Sep. 25, 2015, pp. 57-70.

Lee, D., et al., "High speed remote laser cutting of electrodes for lithium-ion batteries: Anode," Journal of Power Sources, vol. 240, Oct. 15, 2013, pp. 368-380.

Maciá-Agulló, J. A., et al., "Activation of coal tar pitch carbon fibres: Physical activation vs. chemical activation," Carbon, vol. 42, Issue 7, Available online Feb. 13, 2004, pp. 1367-1370.

Mai, L.-Q., et al., "Synergistic interaction between redox-active electrolyte and binder-free functionalized carbon for ultrahigh supercapacitor performance," Nature Communications, vol. 4, Dec. 11, 2013, pp. 2923-2930.

Miller, J. R., "Valuing Reversible Energy Storage," Science, vol. 335, Issue 6074, Mar. 16, 2012, pp. 1312-1313.

Pech, D., et al., "Ultrahigh-power micrometre-sized supercapacitors based on onion-like carbon," Nature Nanotechnology, vol. 5, Published online Aug. 15, 2010, pp. 651-654.

Senthilkumar, S. T., et al., "Electric double layer capacitor and its improved specific capacitance using redox additive electrolyte," Journal of Materials Chemistry A, vol. 1, Nov. 21, 2012, pp. 1086-1095.

Senthilkumar, S. T., et al., "Improved performance of electric double layer capacitor using redox additive (VO2+/VO2+) aqueous electrolyte," Journal of Materials Chemistry A, vol. 1, May 29, 2013, pp. 7913-7919.

Tomai, T., et al., "Metal-free aqueous redox capacitor via proton rocking-chair system in an organic-based couple," Scientific Reports, vol. 4, Jan. 7, 2014, pp. 3591-3596.

Weinstein, L., et al., "Supercapacitor carbons: Have exotic carbons failed?", Materials Today, vol. 16, No. 10, Oct. 2013, pp. 356-357.

Wu, J., et al., "A simple and high-effective electrolyte mediated with p-phenylenediamine for supercapacitor," Journal of Materials Chemistry, vol. 22, Aug. 2, 2012, pp. 19025-19030.

Yang, X., et al., "Liquid-Mediated Dense Integration of Graphene Materials for Compact Capacitive Energy Storage," Science, vol. 341, Aug. 2, 2013, pp. 534-537.

Yu, H., et al., "A novel redox-mediated gel polymer electrolyte for high-performance supercapacitor," Journal of Power Sources, vol. 198, Available online Oct. 5, 2011, pp. 402-407.

Yu, H., et al., "Redox-active alkaline electrolyte for carbon-based supercapacitor with pseudocapacitive performance and excellent cyclability," RSC Advances, vol. 2, Jun. 13, 2012, pp. 6736-6740.

Invitation to Pay Additional Fees for International Patent Application No. PCT/US2017/067541, dated Feb. 22, 2018, 2 pages.

\* cited by examiner

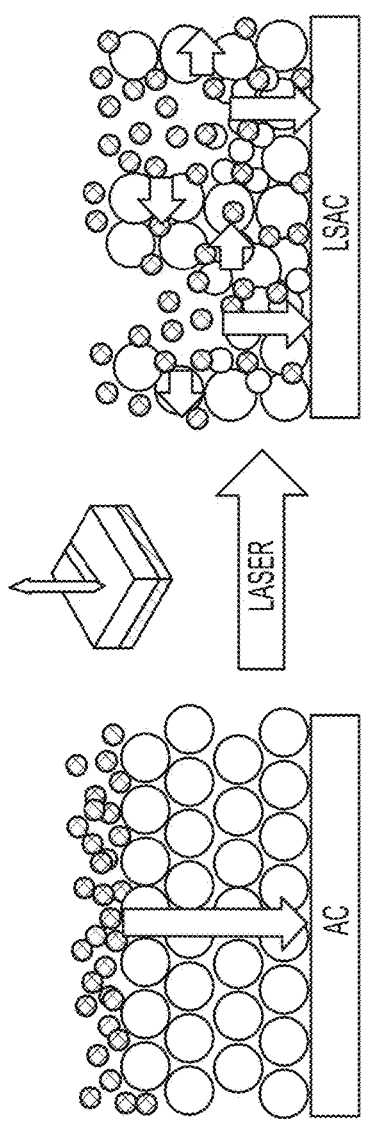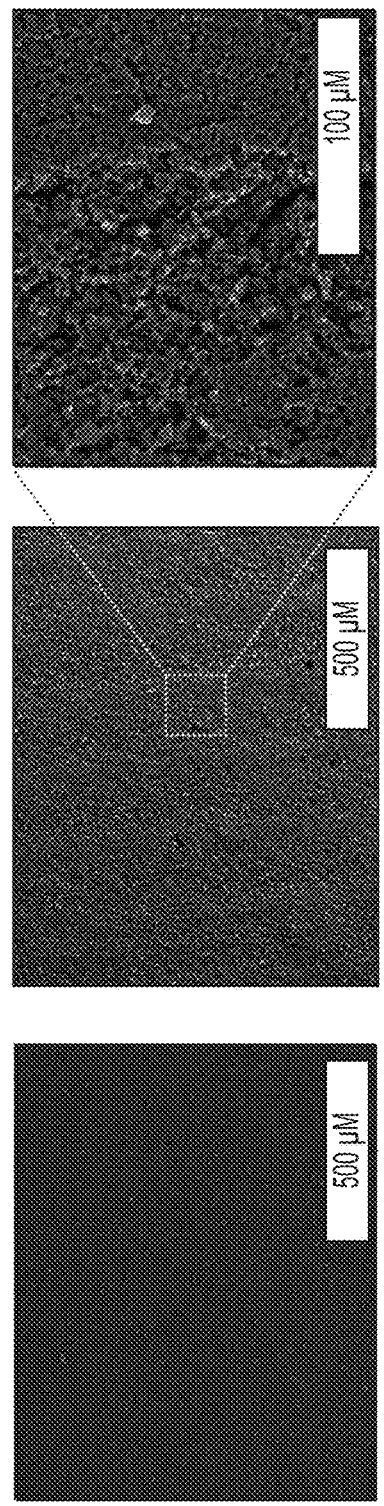
FIG. 1A
FIG. 1B
FIG. 1C
FIG. 1D

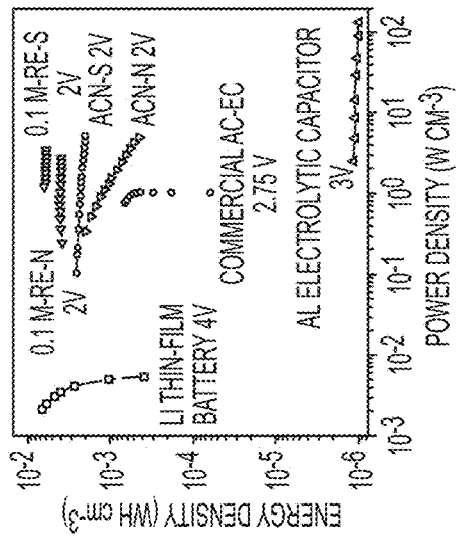
FIG. 6G
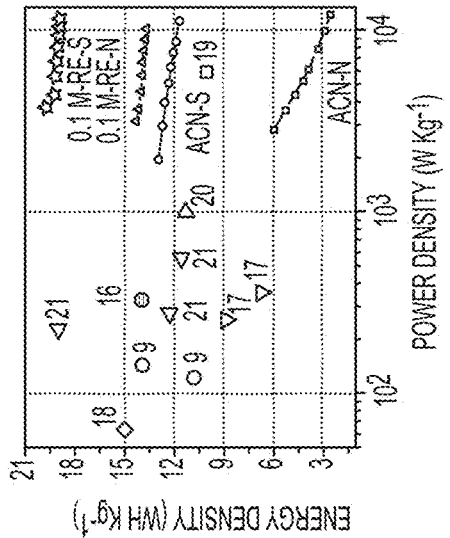
FIG. 6H
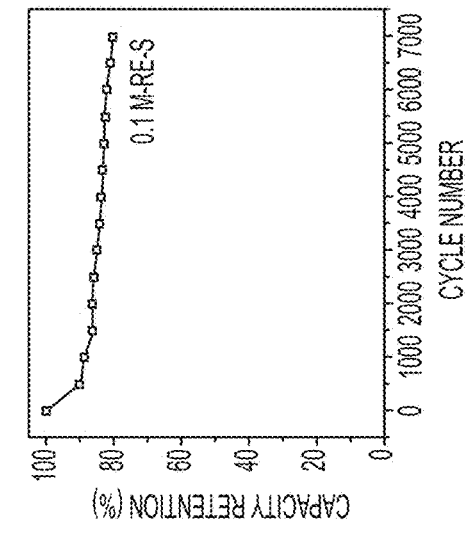
FIG. 6I
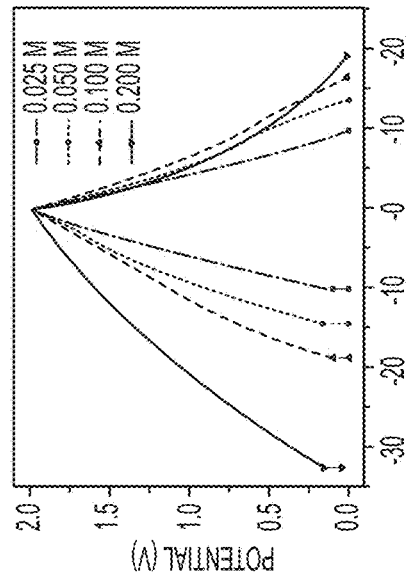
FIG. 7A
| CONCENTRATION OF RE | AREAL CAPACITANCE mF cm$^{-2}$ | COLUMBIC EFFICIENCY % |
|---|---|---|
| 0.025 | 105 | 96 |
| 0.050 | 149 | 95 |
| 0.100 | 170 | 87 |
| 0.200 | 207 | 58 |
FIG. 7B

METHODS, DEVICES AND SYSTEMS FOR ACTIVATED CARBON SUPERCAPACITORS WITH MACROPOROUS ELECTRODES

CROSS REFERENCE

This application claims the benefit of U.S. Provisional Application No. 62/438,377, filed Dec. 22, 2016, which application is incorporated herein by reference.

BACKGROUND

Electrochemical supercapacitors (ESCs) have garnered attention due to their high power density, excellent low temperature performance, and essentially unlimited number of charge/discharge cycles. While ESCs demonstrate excellent electrochemical performance, the high cost per kWh limits the wide-spread adoption of ESCs. Compared with lithium ion batteries, some current supercapacitors exhibit a 10 times higher cost per kWh. The high cost per kWh is a major concern for capacitive energy storage and currently prevents the adoption of supercapacitors to replace batteries in many applications.

SUMMARY

The instant inventors have recognized a need for higher energy density storage devices to power numerous electronic devices including portable electronic devices. Provided herein, in certain embodiments, are carbon-based materials, fabrication and manufacturing methods and processes, and systems for high energy density storage with improved performance. The devices, methods, and systems described herein have numerous potential commercial applications.

In one aspect, the present disclosure provides for an electrode comprising a current collector and an activated carbon substrate. In some embodiments, the current collector comprises a carbon substrate. In some embodiments, the carbon substrate comprises amorphous carbon.

In some embodiments, the activated carbon substrate is chemically activated, physically activated, or any combination thereof. In some embodiments, the activated carbon substrate comprises activated carbon, activated charcoal, activated carbon cloth, activated carbon fiber, activated glassy carbon, activated carbon nanofoam, activated carbon aerogel, or any combination thereof. In some embodiments, the activated carbon substrate is activated carbon cloth. In some embodiments, the activated carbon substrate comprises carbon derived from one or more coconut shells.

In some embodiments, the current collector is metallic. In some embodiments, the current collector is non-metallic. In some embodiments, the current collector comprises aluminum, nickel, copper, platinum, iron, steel, graphite, carbon cloth, or any combination thereof. In some embodiments, the current collector comprises aluminum.

In some embodiments, the electrode comprises one or more channels.

In some embodiments, the one or more channels have a pore size of about 0.05 micrometers to about 500 micrometers. In some embodiments, the one or more channels have a pore size at least about 0.05 micrometers. In some embodiments, the one or more channels have a pore size at most about 500 micrometers. In some embodiments, the one or more channels have a pore size of about 0.05 micrometers to about 0.1 micrometers, about 0.05 micrometers to about 0.5 micrometers, about 0.05 micrometers to about 1 micrometer, about 0.05 micrometers to about 5 micrometers, about 0.05 micrometers to about 10 micrometers, about 0.05 micrometers to about 50 micrometers, about 0.05 micrometers to about 100 micrometers, about 0.05 micrometers to about 200 micrometers, about 0.05 micrometers to about 300 micrometers, about 0.05 micrometers to about 400 micrometers, about 0.05 micrometers to about 500 micrometers, about 0.1 micrometers to about 0.5 micrometers, about 0.1 micrometers to about 1 micrometer, about 0.1 micrometers to about 5 micrometers, about 0.1 micrometers to about 10 micrometers, about 0.1 micrometers to about 50 micrometers, about 0.1 micrometers to about 100 micrometers, about 0.1 micrometers to about 200 micrometers, about 0.1 micrometers to about 300 micrometers, about 0.1 micrometers to about 400 micrometers, about 0.1 micrometers to about 500 micrometers, about 0.5 micrometers to about 1 micrometer, about 0.5 micrometers to about 5 micrometers, about 0.5 micrometers to about 10 micrometers, about 0.5 micrometers to about 50 micrometers, about 0.5 micrometers to about 100 micrometers, about 0.5 micrometers to about 200 micrometers, about 0.5 micrometers to about 300 micrometers, about 0.5 micrometers to about 400 micrometers, about 0.5 micrometers to about 500 micrometers, about 1 micrometer to about 5 micrometers, about 1 micrometer to about 10 micrometers, about 1 micrometer to about 50 micrometers, about 1 micrometer to about 100 micrometers, about 1 micrometer to about 200 micrometers, about 1 micrometer to about 300 micrometers, about 1 micrometer to about 400 micrometers, about 1 micrometer to about 500 micrometers, about 5 micrometers to about 10 micrometers, about 5 micrometers to about 50 micrometers, about 5 micrometers to about 100 micrometers, about 5 micrometers to about 200 micrometers, about 5 micrometers to about 300 micrometers, about 5 micrometers to about 400 micrometers, about 5 micrometers to about 500 micrometers, about 10 micrometers to about 50 micrometers, about 10 micrometers to about 100 micrometers, about 10 micrometers to about 200 micrometers, about 10 micrometers to about 300 micrometers, about 10 micrometers to about 400 micrometers, about 10 micrometers to about 500 micrometers, about 50 micrometers to about 100 micrometers, about 50 micrometers to about 200 micrometers, about 50 micrometers to about 300 micrometers, about 50 micrometers to about 400 micrometers, about 50 micrometers to about 500 micrometers, about 100 micrometers to about 200 micrometers, about 100 micrometers to about 300 micrometers, about 100 micrometers to about 400 micrometers, about 100 micrometers to about 500 micrometers, about 200 micrometers to about 300 micrometers, about 200 micrometers to about 400 micrometers, about 200 micrometers to about 500 micrometers, about 300 micrometers to about 400 micrometers, about 300 micrometers to about 500 micrometers, or about 400 micrometers to about 500 micrometers. In some embodiments, the one or more channels have a pore size about 0.05 micrometers, about 0.1 micrometers, about 0.5 micrometers, about 1 micrometer, about 5 micrometers, about 10 micrometers, about 50 micrometers, about 100 micrometers, about 200 micrometers, about 300 micrometers, about 400 micrometers, or about 500 micrometers.

In some embodiments, the electrode has an areal capacitance of about 50 mF/cm$^2$ to about 800 mF/cm$^2$. In some embodiments, the electrode has an areal capacitance of at least about 50 mF/cm$^2$. In some embodiments, the electrode has an areal capacitance of at most about 800 mF/cm$^2$. In some embodiments, the electrode has an areal capacitance of about 50 mF/cm$^2$ to about 75 mF/cm$^2$, about 50 mF/cm$^2$ to about 100 mF/cm², about 50 mF/cm² to about 150 mF/cm², about 50 mF/cm² to about 200 mF/cm², about 50 mF/cm² to about 250 mF/cm², about 50 mF/cm² to about 300 mF/cm², about 50 mF/cm² to about 400 mF/cm², about 50 mF/cm² to about 500 mF/cm², about 50 mF/cm² to about 600 mF/cm², about 50 mF/cm² to about 700 mF/cm², about 50 mF/cm² to about 800 mF/cm², about 75 mF/cm² to about 100 mF/cm², about 75 mF/cm² to about 150 mF/cm², about 75 mF/cm² to about 200 mF/cm², about 75 mF/cm² to about 250 mF/cm², about 75 mF/cm² to about 300 mF/cm², about 75 mF/cm² to about 400 mF/cm², about 75 mF/cm² to about 500 mF/cm², about 75 mF/cm² to about 600 mF/cm², about 75 mF/cm² to about 700 mF/cm², about 75 mF/cm² to about 800 mF/cm², about 100 mF/cm² to about 150 mF/cm², about 100 mF/cm² to about 200 mF/cm², about 100 mF/cm² to about 250 mF/cm², about 100 mF/cm² to about 300 mF/cm², about 100 mF/cm² to about 400 mF/cm², about 100 mF/cm² to about 500 mF/cm², about 100 mF/cm² to about 600 mF/cm², about 100 mF/cm² to about 700 mF/cm², about 100 mF/cm² to about 800 mF/cm², about 150 mF/cm² to about 200 mF/cm², about 150 mF/cm² to about 250 mF/cm², about 150 mF/cm² to about 300 mF/cm², about 150 mF/cm² to about 400 mF/cm², about 150 mF/cm² to about 500 mF/cm², about 150 mF/cm² to about 600 mF/cm², about 150 mF/cm² to about 700 mF/cm², about 150 mF/cm² to about 800 mF/cm², about 200 mF/cm² to about 250 mF/cm², about 200 mF/cm² to about 300 mF/cm², about 200 mF/cm² to about 400 mF/cm², about 200 mF/cm² to about 500 mF/cm², about 200 mF/cm² to about 600 mF/cm², about 200 mF/cm² to about 700 mF/cm², about 200 mF/cm² to about 800 mF/cm², about 250 mF/cm² to about 300 mF/cm², about 250 mF/cm² to about 400 mF/cm², about 250 mF/cm² to about 500 mF/cm², about 250 mF/cm² to about 600 mF/cm², about 250 mF/cm² to about 700 mF/cm², about 250 mF/cm² to about 800 mF/cm², about 300 mF/cm² to about 400 mF/cm², about 300 mF/cm² to about 500 mF/cm², about 300 mF/cm² to about 600 mF/cm², about 300 mF/cm² to about 700 mF/cm², about 300 mF/cm² to about 800 mF/cm², about 400 mF/cm² to about 500 mF/cm², about 400 mF/cm² to about 600 mF/cm², about 400 mF/cm² to about 700 mF/cm², about 400 mF/cm² to about 800 mF/cm², about 500 mF/cm² to about 600 mF/cm², about 500 mF/cm² to about 700 mF/cm², about 500 mF/cm² to about 800 mF/cm², about 600 mF/cm² to about 700 mF/cm², about 600 mF/cm² to about 800 mF/cm², or about 700 mF/cm² to about 800 mF/cm². In some embodiments, the electrode has an areal capacitance of about 50 mF/cm², about 75 mF/cm², about 100 mF/cm², about 150 mF/cm², about 200 mF/cm², about 250 mF/cm², about 300 mF/cm², about 400 mF/cm², about 500 mF/cm², about 600 mF/cm², about 700 mF/cm², or about 800 mF/cm².

In some embodiments, the electrode has a gravimetric capacitance of about 80 F/g to about 150 F/g. In some embodiments, the electrode has a gravimetric capacitance of at least about 80 F/g. In some embodiments, the electrode has a gravimetric capacitance of at most about 150 F/g. In some embodiments, the electrode has a gravimetric capacitance of about 80 F/g to about 90 F/g, about 80 F/g to about 100 F/g, about 80 F/g to about 110 F/g, about 80 F/g to about 120 F/g, about 80 F/g to about 130 F/g, about 80 F/g to about 140 F/g, about 80 F/g to about 150 F/g, about 90 F/g to about 100 F/g, about 90 F/g to about 110 F/g, about 90 F/g to about 120 F/g, about 90 F/g to about 130 F/g, about 90 F/g to about 140 F/g, about 90 F/g to about 150 F/g, about 100 F/g to about 110 F/g, about 100 F/g to about 120 F/g, about 100 F/g to about 130 F/g, about 100 F/g to about 140 F/g, about 100 F/g to about 150 F/g, about 110 F/g to about 120 F/g, about 110 F/g to about 130 F/g, about 110 F/g to about 140 F/g, about 110 F/g to about 150 F/g, about 120 F/g to about 130 F/g, about 120 F/g to about 140 F/g, about 120 F/g to about 150 F/g, about 130 F/g to about 140 F/g, about 130 F/g to about 150 F/g, or about 140 F/g to about 150 F/g. In some embodiments, the electrode has a gravimetric capacitance of about 80 F/g, about 90 F/g, about 100 F/g, about 110 F/g, about 120 F/g, about 130 F/g, about 140 F/g, or about 150 F/g. In some embodiments, the electrode has a packing density of about 0.1 g/cm³ to about 1 g/cm³. In some embodiments, the electrode has a packing density of at least about 0.1 g/cm³. In some embodiments, the electrode has a packing density of at most about 1 g/cm³. In some embodiments, the electrode has a packing density of about 0.1 g/cm³ to about 0.2 g/cm³, about 0.1 g/cm³ to about 0.3 g/cm³, about 0.1 g/cm³ to about 0.4 g/cm³, about 0.1 g/cm³ to about 0.5 g/cm³, about 0.1 g/cm³ to about 0.6 g/cm³, about 0.1 g/cm³ to about 0.7 g/cm³, about 0.1 g/cm³ to about 0.8 g/cm³, about 0.1 g/cm³ to about 0.9 g/cm³, about 0.1 g/cm³ to about 1 g/cm³, about 0.2 g/cm³ to about 0.3 g/cm³, about 0.2 g/cm³ to about 0.4 g/cm³, about 0.2 g/cm³ to about 0.5 g/cm³, about 0.2 g/cm³ to about 0.6 g/cm³, about 0.2 g/cm³ to about 0.7 g/cm³, about 0.2 g/cm³ to about 0.8 g/cm³, about 0.2 g/cm³ to about 0.9 g/cm³, about 0.2 g/cm³ to about 1 g/cm³, about 0.3 g/cm³ to about 0.4 g/cm³, about 0.3 g/cm³ to about 0.5 g/cm³, about 0.3 g/cm³ to about 0.6 g/cm³, about 0.3 g/cm³ to about 0.7 g/cm³, about 0.3 g/cm³ to about 0.8 g/cm³, about 0.3 g/cm³ to about 0.9 g/cm³, about 0.3 g/cm³ to about 1 g/cm³, about 0.4 g/cm³ to about 0.5 g/cm³, about 0.4 g/cm³ to about 0.6 g/cm³, about 0.4 g/cm³ to about 0.7 g/cm³, about 0.4 g/cm³ to about 0.8 g/cm³, about 0.4 g/cm³ to about 0.9 g/cm³, about 0.4 g/cm³ to about 1 g/cm³, about 0.5 g/cm³ to about 0.6 g/cm³, about 0.5 g/cm³ to about 0.7 g/cm³, about 0.5 g/cm³ to about 0.8 g/cm³, about 0.5 g/cm³ to about 0.9 g/cm³, about 0.5 g/cm³ to about 1 g/cm³, about 0.6 g/cm³ to about 0.7 g/cm³, about 0.6 g/cm³ to about 0.8 g/cm³, about 0.6 g/cm³ to about 0.9 g/cm³, about 0.6 g/cm³ to about 1 g/cm³, about 0.7 g/cm³ to about 0.8 g/cm³, about 0.7 g/cm³ to about 0.9 g/cm³, about 0.7 g/cm³ to about 1 g/cm³, about 0.8 g/cm³ to about 0.9 g/cm³, about 0.8 g/cm³ to about 1 g/cm³, or about 0.9 g/cm³ to about 1 g/cm³. In some embodiments, the electrode has a packing density of about 0.1 g/cm³, about 0.2 g/cm³, about 0.3 g/cm³, about 0.4 g/cm³, about 0.5 g/cm³, about 0.6 g/cm³, about 0.7 g/cm³, about 0.8 g/cm³, about 0.9 g/cm³, or about 1 g/cm³.

In one aspect, the present disclosure provides methods comprising receiving an activated carbon substrate; casting the activated carbon substrate on a current collector having a carbon-based coating; and generating a light beam having a power density to generate one or more channels in the activated carbon substrate, thereby creating an activated carbon-based electrode comprising one or more channels.

In some embodiments, the light beam has a wavelength of about 375 nanometers to about 10,000 nanometers. In some embodiments, the light beam has a wavelength of at least about 375 nanometers. In some embodiments, the light beam has a wavelength of at most about 10,000 nanometers. In some embodiments, the light beam has a wavelength of about 375 nanometers to about 470 nanometers, about 375 nanometers to about 530 nanometers, about 375 nanometers to about 600 nanometers, about 375 nanometers to about 780 nanometers, about 375 nanometers to about 1,000 nanometers, about 375 nanometers to about 2,000 nanometers, about 375 nanometers to about 3,000 nanometers, about 375 nanometers to about 5,000 nanometers, about 375 nanometers to about 7,000 nanometers, about 375 nanometers to about 10,000 nanometers, about 470 nanometers to about 530 nanometers, about 470 nanometers to about 600 nanometers, about 470 nanometers to about 780 nanometers, about 470 nanometers to about 1,000 nanometers, about 470 nanometers to about 2,000 nanometers, about 470 nanometers to about 3,000 nanometers, about 470 nanometers to about 5,000 nanometers, about 470 nanometers to about 7,000 nanometers, about 470 nanometers to about 10,000 nanometers, about 530 nanometers to about 600 nanometers, about 530 nanometers to about 780 nanometers, about 530 nanometers to about 1,000 nanometers, about 530 nanometers to about 2,000 nanometers, about 530 nanometers to about 3,000 nanometers, about 530 nanometers to about 5,000 nanometers, about 530 nanometers to about 7,000 nanometers, about 530 nanometers to about 10,000 nanometers, about 600 nanometers to about 780 nanometers, about 600 nanometers to about 1,000 nanometers, about 600 nanometers to about 2,000 nanometers, about 600 nanometers to about 3,000 nanometers, about 600 nanometers to about 5,000 nanometers, about 600 nanometers to about 7,000 nanometers, about 600 nanometers to about 10,000 nanometers, about 780 nanometers to about 1,000 nanometers, about 780 nanometers to about 2,000 nanometers, about 780 nanometers to about 3,000 nanometers, about 780 nanometers to about 5,000 nanometers, about 780 nanometers to about 7,000 nanometers, about 780 nanometers to about 10,000 nanometers, about 1,000 nanometers to about 2,000 nanometers, about 1,000 nanometers to about 3,000 nanometers, about 1,000 nanometers to about 5,000 nanometers, about 1,000 nanometers to about 7,000 nanometers, about 1,000 nanometers to about 10,000 nanometers, about 2,000 nanometers to about 3,000 nanometers, about 2,000 nanometers to about 5,000 nanometers, about 2,000 nanometers to about 7,000 nanometers, about 2,000 nanometers to about 10,000 nanometers, about 3,000 nanometers to about 5,000 nanometers, about 3,000 nanometers to about 7,000 nanometers, about 3,000 nanometers to about 10,000 nanometers, about 5,000 nanometers to about 7,000 nanometers, about 5,000 nanometers to about 10,000 nanometers, or about 7,000 nanometers to about 10,000 nanometers. In some embodiments, the light beam has a wavelength of about 375 nanometers, about 470 nanometers, about 530 nanometers, about 600 nanometers, about 780 nanometers, about 1,000 nanometers, about 2,000 nanometers, about 3,000 nanometers, about 5,000 nanometers, about 7,000 nanometers, or about 10,000 nanometers.

In some embodiments, the light beam has a power density of about 0.01 W to about 100 W. In some embodiments, the light beam has a power density of at least about 0.01 W. In some embodiments, the light beam has a power density of at most about 100 W. In some embodiments, the light beam has a power density of about 0.01 W to about 0.05 W, about 0.01 W to about 0.1 W, about 0.01 W to about 0.2 W, about 0.01 W to about 0.5 W, about 0.01 W to about 1 W, about 0.01 W to about 2 W, about 0.01 W to about 5 W, about 0.01 W to about 10 W, about 0.01 W to about 20 W, about 0.01 W to about 50 W, about 0.01 W to about 100 W, about 0.05 W to about 0.1 W, about 0.05 W to about 0.2 W, about 0.05 W to about 0.5 W, about 0.05 W to about 1 W, about 0.05 W to about 2 W, about 0.05 W to about 5 W, about 0.05 W to about 10 W, about 0.05 W to about 20 W, about 0.05 W to about 50 W, about 0.05 W to about 100 W, about 0.1 W to about 0.2 W, about 0.1 W to about 0.5 W, about 0.1 W to about 1 W, about 0.1 W to about 2 W, about 0.1 W to about 5 W, about 0.1 W to about 10 W, about 0.1 W to about 20 W, about 0.1 W to about 50 W, about 0.1 W to about 100 W, about 0.2 W to about 0.5 W, about 0.2 W to about 1 W, about 0.2 W to about 2 W, about 0.2 W to about 5 W, about 0.2 W to about 10 W, about 0.2 W to about 20 W, about 0.2 W to about 50 W, about 0.2 W to about 100 W, about 0.5 W to about 1 W, about 0.5 W to about 2 W, about 0.5 W to about 5 W, about 0.5 W to about 10 W, about 0.5 W to about 20 W, about 0.5 W to about 50 W, about 0.5 W to about 100 W, about 1 W to about 2 W, about 1 W to about 5 W, about 1 W to about 10 W, about 1 W to about 20 W, about 1 W to about 50 W, about 1 W to about 100 W, about 2 W to about 5 W, about 2 W to about 10 W, about 2 W to about 20 W, about 2 W to about 50 W, about 2 W to about 100 W, about 5 W to about 10 W, about 5 W to about 20 W, about 5 W to about 50 W, about 5 W to about 100 W, about 10 W to about 20 W, about 10 W to about 50 W, about 10 W to about 100 W, about 20 W to about 50 W, about 20 W to about 100 W, or about 50 W to about 100 W. In some embodiments, the light beam has a power density of about 0.01 W, about 0.05 W, about 0.1 W, about 0.2 W, about 0.5 W, about 1 W, about 2 W, about 5 W, about 10 W, about 20 W, about 50 W, or about 100 W.

In some embodiments, the carbon-based coating comprises amorphous carbon. In some embodiments, the activated carbon substrate is chemically activated, physically activated, or any combination thereof. In some embodiments, the activated carbon substrate comprises activated carbon, activated charcoal, activated carbon cloth, activated carbon fiber, activated glassy carbon, activated carbon nanofoam, activated carbon aerogel, or any combination thereof. In some embodiments, the activated carbon substrate is activated carbon cloth. In some embodiments, the activated carbon substrate comprises carbon derived from one or more coconut shells.

In some embodiments, the current collector is metallic. In some embodiments, the current collector is non-metallic. In some embodiments, the current collector comprises aluminum, nickel, copper, platinum, iron, steel, graphite, carbon cloth, or combinations thereof. In some embodiments, the current collector comprises aluminum.

In some embodiments, the one or more channels have a pore size from about 50 nanometers to about 500 micrometers. In some embodiments, the one or more channels have a pore size of about 100 micrometers. In some embodiments, the one or more channels have a pore size of at least about 50 nanometers. In some embodiments, the one or more channels have a pore size of at most about 500 micrometers.

In some embodiments, the activated carbon-based electrode has an areal capacitance of about 50 $mF/cm^2$ to about 800 $mF/cm^2$. In some embodiments, the activated carbon-based electrode has an areal capacitance of at least about 50 $mF/cm^2$. In some embodiments, the activated carbon-based electrode has an areal capacitance of at most about 800 $mF/cm^2$. In some embodiments, the activated carbon-based electrode has a gravimetric capacitance of about 80 F/g to about 150 F/g. In some embodiments, the activated carbon-based electrode has a gravimetric capacitance of at least about 80 F/g. In some embodiments, the activated carbon-based electrode has a gravimetric capacitance of at most about 150 F/g.

In some embodiments, the activated carbon-based electrode has a packing density of about 0.1 $g/cm^3$ to 1.0 $g/cm^3$. In some embodiments, the activated carbon-based electrode has a packing density of at least about 0.1 $g/cm^3$. In some embodiments, the activated carbon-based electrode has a packing density of at most about 1.0 $g/cm^3$. In some embodiments, the activated carbon-based electrode has a packing density of about 0.5 $g/cm^3$.

In one aspect, the present disclosure provides a supercapacitor comprising a first electrode, a second electrode, and an electrolyte, wherein at least the first electrode or the second electrode comprises a current collector and an activated carbon substrate.

In some embodiments, the current collector comprises a carbon substrate. In some embodiments, the carbon substrate comprises amorphous carbon. In some embodiments, the activated carbon substrate is chemically activated, physically activated, or any combination thereof. In some embodiments, the activated carbon substrate comprises activated carbon, activated charcoal, activated carbon cloth, activated carbon fiber, activated glassy carbon, activated carbon nanofoam, activated carbon aerogel, or any combination thereof. In some embodiments, the activated carbon substrate is activated carbon cloth. In some embodiments, the activated carbon substrate comprises carbon derived from one or more coconut shells.

In some embodiments, the current collector is metallic. In some embodiments, the current collector is non-metallic. In some embodiments, the current collector comprises aluminum, nickel, copper, platinum, iron, steel, graphite, carbon cloth, or combinations thereof. In some embodiments, the current collector comprises aluminum.

In some embodiments, at least one of the first electrode and the second electrode comprises one or more channels. In some embodiments, the one or more channels have a pore size from about 50 nanometers to about 500 micrometers. In some embodiments, the one or more channels have a pore size of about 100 micrometers. In some embodiments, the one or more channels have a pore size of at least about 50 nanometers. In some embodiments, the one or more channels have a pore size of at most about 500 micrometers.

In some embodiments, the supercapacitor has an areal capacitance of about 50 mF/cm$^2$ to about 800 mF/cm$^2$. In some embodiments, the supercapacitor has an areal capacitance of at least about 50 mF/cm$^2$. In some embodiments, the supercapacitor has an areal capacitance of at most about 800 mF/cm$^2$. In some embodiments, the supercapacitor has a gravimetric capacitance of about 80 F/g to about 150 F/g. In some embodiments, the supercapacitor has a gravimetric capacitance of at least about 80 F/g. In some embodiments, the supercapacitor has a gravimetric capacitance of at most about 150 F/g.

In some embodiments, the electrolyte is aqueous. In some embodiments, the electrolyte comprises tetraethylammonium tetrafluoroborate (TEABF$_4$) in acetonitrile. In some embodiments, the electrolyte comprises from about 0.1M to about 1.5 M tetraethylammonium tetrafluoroborate (TEABF$_4$) in acetonitrile. In some embodiments, the electrolyte comprises about 1 M tetraethylammonium tetrafluoroborate (TEABF$_4$) in acetonitrile.

In some embodiments, the electrolyte is non-aqueous. In some embodiments, the electrolyte comprises one or more ionic liquids. In some embodiments, the one or more ionic liquids are in a pure form or are dissolved in a solvent. In some embodiments, the solvent is acetonitrile. In some embodiments, the electrolyte comprises 1-Allyl-3-methylimidazolium bis(trifluoromethylsulfonyl)imide, 1-Ethyl-3-methylimidazolium tetrafluoroborate, 1-Butyl-3-methylimidazolium tetrafluoroborate, 1-Hexyl-3-methylimidazolium bis(trifluormethylsulfonyl)imide, 1-Butyl-3-methylimidazolium trifluoromethanesulfonate, 1-Ethyl-3-methylimidazolium 1,1,2,2-tetrafluoroethanesulfonate, 1-Ethyl-3-methylimidazolium trifluoromethanesulfonate, 1-Ethyl-3-methylimidazolium diethyl phosphate, or any combination thereof.

In one aspect, the present disclosure provides an electrolyte comprising an oxidizing agent, a reducing agent, and an aqueous solution. In some embodiments, the oxidizing agent and the reducing agent comprise a redox couple. In some embodiments, the redox couple comprises fluorine, manganese, chlorine, chromium, oxygen, silver, iron, iodine, copper, tin, quinone, bromine, iodine, vanadium, or combinations thereof. In some embodiments, the redox couple comprises potassium ferrocyanide, hydroquinone, vanadyly sulfate, p-phenylenediamine, p-phenylenediimine, potassium iodide, potassium bromide, copper chloride, hydroquinone, copper sulfate, heptylviologen dibromide, methyl viologen bromide, or any combination thereof. In some embodiments, the redox couple comprises ferric cations. In some embodiments, the redox couple comprises Fe(CN)$_6^{3-}$/Fe(CN)$_6^{4-}$.

In some embodiments, the aqueous solution comprises sulfate ions. In some embodiments, the aqueous solution comprises sodium ions. In some embodiments, the aqueous solution comprises Na$_2$SO$_4$.

In some embodiments, the electrolyte comprises Fe(CN)$_6^{3-}$/Fe(CN)$_6^{4-}$ and Na$_2$SO$_4$. In some embodiments, the electrolyte comprises about 1 M Na$_2$SO$_4$. In some embodiments, the electrolyte comprises about 0.01 M to about 1.0 M of Fe(CN)$_6^{3-}$/Fe(CN)$_6^{4-}$. In some embodiments, the electrolyte comprises about 0.025 M Fe(CN)$_6^{3-}$/Fe(CN)$_6^{4-}$ and about 1.0 M Na$_2$SO$_4$. In some embodiments, the electrolyte comprises about 0.050M Fe(CN)$_6^{3-}$/Fe(CN)$_6^{4-}$ and about 1.0 M Na$_2$SO$_4$. In some embodiments, the electrolyte comprises about 0.100 M Fe(CN)$_6^{3-}$/Fe(CN)$_6^{4-}$ and about 1.0 M Na$_2$SO$_4$. In some embodiments, the electrolyte comprises about 0.200 M Fe(CN)$_6^{3-}$/Fe(CN)$_6^{4-}$ and about 1.0 M Na$_2$SO$_4$.

In one aspect, the present disclosure provides a supercapacitor comprising a first electrode, a second electrode, and an electrolyte. In some embodiments, the electrolyte comprises an oxidizing agent, a reducing agent, and an aqueous solution. In some embodiments, the oxidizing agent and the reducing agent comprise a redox couple. In some embodiments, the redox couple comprises fluorine, manganese, chlorine, chromium, oxygen, silver, iron, iodine, copper, tin, quinone, bromine, iodine, vanadium, or combinations thereof. In some embodiments, the redox couple comprises potassium ferrocyanide, hydroquinone, vanadyly sulfate, p-phenylenediamine, p-phenylenediimine, potassium iodide, potassium bromide, copper chloride, hydroquinone, copper sulfate, heptylviologen dibromidemethyl viologen bromide, or any combination thereof. In some embodiments, the redox couple comprises ferric cations. In some embodiments, the redox couple comprises Fe(CN)$_6^{3-}$/Fe(CN)$_6^{4-}$.

In some embodiments, the aqueous solution comprises sulfate ions. In some embodiments, the aqueous solution comprises sodium ions. In some embodiments, the aqueous solution comprises Na$_2$SO$_4$.

In some embodiments, the electrolyte comprises Fe(CN)$_6^{3-}$/Fe(CN)$_6^{4-}$ and Na$_2$SO$_4$. In some embodiments, the electrolyte comprises about 1 M Na$_2$SO$_4$. In some embodiments, electrolyte comprises about 0.01 M to about 1.0 M of Fe(CN)$_6^{3-}$/Fe(CN)$_6^{4-}$. In some embodiments, the electrolyte comprises about 0.025 M Fe(CN)$_6^{3-}$/Fe(CN)$_6^{4-}$ and about 1.0 M Na$_2$SO$_4$. In some embodiments, the electrolyte comprises about 0.050 M Fe(CN)$_6^{3-}$/Fe(CN)$_6^{4-}$ and about 1.0 M Na$_2$SO$_4$. In some embodiments, the electrolyte comprises about 0.100 M Fe(CN)$_6^{3-}$/Fe(CN)$_6^{4-}$ and about 1.0 M Na$_2$SO$_4$. In some embodiments, the electrolyte comprises about 0.200 M Fe(CN)$_6^{3-}$/Fe(CN)$_6^{4-}$ and about 1.0 M Na$_2$SO$_4$.

In some embodiments, the supercapacitor has an areal capacitance of about 105 mF/cm$^2$ to about 335 mF/cm$^2$. In some embodiments, the supercapacitor has an areal capacitance of at least about 105 mF/cm². In some embodiments, the supercapacitor has an areal capacitance of at most about 335 mF/cm². In some embodiments, the supercapacitor has an areal capacitance of about 105 mF/cm² to about 125 mF/cm², about 105 mF/cm² to about 150 mF/cm², about 105 mF/cm² to about 175 mF/cm², about 105 mF/cm² to about 200 mF/cm², about 105 mF/cm² to about 225 mF/cm², about 105 mF/cm² to about 250 mF/cm², about 105 mF/cm² to about 275 mF/cm², about 105 mF/cm² to about 300 mF/cm², about 105 mF/cm² to about 335 mF/cm², about 125 mF/cm² to about 150 mF/cm², about 125 mF/cm² to about 175 mF/cm², about 125 mF/cm² to about 200 mF/cm², about 125 mF/cm² to about 225 mF/cm², about 125 mF/cm² to about 250 mF/cm², about 125 mF/cm² to about 275 mF/cm², about 125 mF/cm² to about 300 mF/cm², about 125 mF/cm² to about 335 mF/cm², about 150 mF/cm² to about 175 mF/cm², about 150 mF/cm² to about 200 mF/cm², about 150 mF/cm² to about 225 mF/cm², about 150 mF/cm² to about 250 mF/cm², about 150 mF/cm² to about 275 mF/cm², about 150 mF/cm² to about 300 mF/cm², about 150 mF/cm² to about 335 mF/cm², about 175 mF/cm² to about 200 mF/cm², about 175 mF/cm² to about 225 mF/cm², about 175 mF/cm² to about 250 mF/cm², about 175 mF/cm² to about 275 mF/cm², about 175 mF/cm² to about 300 mF/cm², about 175 mF/cm² to about 335 mF/cm², about 200 mF/cm² to about 225 mF/cm², about 200 mF/cm² to about 250 mF/cm², about 200 mF/cm² to about 275 mF/cm², about 200 mF/cm² to about 300 mF/cm², about 200 mF/cm² to about 335 mF/cm², about 225 mF/cm² to about 250 mF/cm², about 225 mF/cm² to about 275 mF/cm², about 225 mF/cm² to about 300 mF/cm², about 225 mF/cm² to about 335 mF/cm², about 250 mF/cm² to about 275 mF/cm², about 250 mF/cm² to about 300 mF/cm², about 250 mF/cm² to about 335 mF/cm², about 275 mF/cm² to about 300 mF/cm², about 275 mF/cm² to about 335 mF/cm², or about 300 mF/cm² to about 335 mF/cm². In some embodiments, the supercapacitor has an areal capacitance of about 105 mF/cm², about 125 mF/cm², about 150 mF/cm², about 175 mF/cm², about 200 mF/cm², about 225 mF/cm², about 250 mF/cm², about 275 mF/cm², about 300 mF/cm², or about 335 mF/cm².

In some embodiments, the supercapacitor has a columbic efficiency of about 58% to about 98%. In some embodiments, the supercapacitor has a columbic efficiency of at least about 58%. In some embodiments, the supercapacitor has a columbic efficiency of at most about 98%. In some embodiments, the supercapacitor has a columbic efficiency of about 58% to about 60%, about 58% to about 65%, about 58% to about 70%, about 58% to about 75%, about 58% to about 80%, about 58% to about 85%, about 58% to about 90%, about 58% to about 95%, about 58% to about 98%, about 60% to about 65%, about 60% to about 70%, about 60% to about 75%, about 60% to about 80%, about 60% to about 85%, about 60% to about 90%, about 60% to about 95%, about 60% to about 98%, about 65% to about 70%, about 65% to about 75%, about 65% to about 80%, about 65% to about 85%, about 65% to about 90%, about 65% to about 95%, about 65% to about 98%, about 70% to about 75%, about 70% to about 80%, about 70% to about 85%, about 70% to about 90%, about 70% to about 95%, about 70% to about 98%, about 75% to about 80%, about 75% to about 85%, about 75% to about 90%, about 75% to about 95%, about 75% to about 98%, about 80% to about 85%, about 80% to about 90%, about 80% to about 95%, about 80% to about 98%, about 85% to about 90%, about 85% to about 95%, about 85% to about 98%, about 90% to about 95%, about 90% to about 98%, or about 95% to about 98%.

In some embodiments, the supercapacitor has a columbic efficiency of about 58%, about 60%, about 65%, about 70%, about 75%, about 80%, about 85%, about 90%, about 95%, or about 98%.

In some embodiments, the supercapacitor has a gravimetric capacitance of about 80 F/g to about 150 F/g. In some embodiments, the supercapacitor has a gravimetric capacitance of at least about 80 F/g. In some embodiments, the supercapacitor has a gravimetric capacitance of at most about 150 F/g. In some embodiments, the supercapacitor has a gravimetric capacitance of about 80 F/g to about 90 F/g, about 80 F/g to about 100 F/g, about 80 F/g to about 110 F/g, about 80 F/g to about 120 F/g, about 80 F/g to about 130 F/g, about 80 F/g to about 140 F/g, about 80 F/g to about 150 F/g, about 90 F/g to about 100 F/g, about 90 F/g to about 110 F/g, about 90 F/g to about 120 F/g, about 90 F/g to about 130 F/g, about 90 F/g to about 140 F/g, about 90 F/g to about 150 F/g, about 100 F/g to about 110 F/g, about 100 F/g to about 120 F/g, about 100 F/g to about 130 F/g, about 100 F/g to about 140 F/g, about 100 F/g to about 150 F/g, about 110 F/g to about 120 F/g, about 110 F/g to about 130 F/g, about 110 F/g to about 140 F/g, about 110 F/g to about 150 F/g, about 120 F/g to about 130 F/g, about 120 F/g to about 140 F/g, about 120 F/g to about 150 F/g, about 130 F/g to about 140 F/g, about 130 F/g to about 150 F/g, or about 140 F/g to about 150 F/g. In some embodiments, the supercapacitor has a gravimetric capacitance of about 80 F/g, about 90 F/g, about 100 F/g, about 110 F/g, about 120 F/g, about 130 F/g, about 140 F/g, or about 150 F/g.

In one aspect, the present disclosure presents a supercapacitor comprising a first electrode, a second electrode, and an electrolyte, wherein at least the first electrode or the second electrode comprises a current collector and an activated carbon substrate. In some embodiments, the current collector comprises a carbon substrate. In some embodiments, the carbon substrate comprises amorphous carbon.

In some embodiments, the activated carbon substrate is chemically activated, physically activated, or any combination thereof. In some embodiments, the activated carbon substrate comprises activated carbon, activated charcoal, activated carbon cloth, activated carbon fiber, activated glassy carbon, activated carbon nanofoam, activated carbon aerogel, or combinations thereof. In some embodiments, the activated carbon substrate is activated carbon cloth. In some embodiments, the activated carbon substrate comprises carbon derived from one or more coconut shells.

In some embodiments, the current collector is metallic. In some embodiments, the current collector is non-metallic. In some embodiments, the current collector comprises aluminum, nickel, copper, platinum, iron, steel, graphite, carbon cloth, or combinations thereof. In some embodiments, the current collector comprises aluminum.

In some embodiments, at least the first electrode or second electrode comprises one or more channels. In some embodiments, the one or more channels have a pore size from about 50 nanometers to about 500 micrometers. In some embodiments, the one or more channels have a pore size of about 100 micrometers. In some embodiments, the one or more channels have a pore size of at least about 50 nanometers. In some embodiments, the one or more channels have a pore size of at most about 500 micrometers.

In some embodiments, the electrolyte comprises an oxidizing agent, a reducing agent, and an aqueous solution. In some embodiments, the oxidizing agent and the reducing agent comprise a redox couple. In some embodiments, the redox couple comprises fluorine, manganese, chlorine, chromium, oxygen, silver, iron, iodine, copper, tin, quinone, bromine, iodine, vanadium, or combinations thereof. In some embodiments, the redox couple comprises potassium ferrocyanide, hydroquinone, vanadyly sulfate, p-phenylenediamine, p-phenylenediimine, potassium iodide, potassium bromide, copper chloride, hydroquinone, copper sulfate, heptylviologen dibromidemethyl viologen bromide, or any combination thereof. In some embodiments, the redox couple comprises ferric cations. In some embodiments, the redox couple comprises $Fe(CN)_6^{3-}/Fe(CN)_6^{4-}$.

In some embodiments, the aqueous solution comprises sulfate ions. In some embodiments, the aqueous solution comprises sodium ions. In some embodiments, the aqueous solution comprises $Na_2SO_4$.

In some embodiments, the electrolyte comprises $Fe(CN)_6^{3-}/Fe(CN)_6^{4-}$ and $Na_2SO_4$. In some embodiments, the electrolyte comprises about 1 M $Na_2SO_4$. In some embodiments, the electrolyte comprises about 0.01 M to about 1.0 M of $Fe(CN)_6^{3-}/Fe(CN)_6^{4-}$. In some embodiments, the electrolyte comprises about 0.025 M $Fe(CN)_6^{3-}/Fe(CN)_6^{4-}$ and about 1.0 M $Na_2SO_4$. In some embodiments, the electrolyte comprises about 0.050 M $Fe(CN)_6^{3-}/Fe(CN)_6^{4-}$ and about 1.0 M $Na_2SO_4$. In some embodiments, the electrolyte comprises about 0.100 M $Fe(CN)_6^{3-}/Fe(CN)_6^{4-}$ and about 1.0 M $Na_2SO_4$. In some embodiments, the electrolyte comprises about 0.200 M $Fe(CN)_6^{3-}/Fe(CN)_6^{4-}$ and about 1.0 M $Na_2SO_4$.

In some embodiments, the supercapacitor has an areal capacitance of about 360 mF/cm² to about 380 mF/cm².

In some embodiments, the supercapacitor has a volumetric energy density of about 0.5 mWh/cm³ to about 6 mWh/cm³. In some embodiments, the supercapacitor has a volumetric energy density of at least about 0.5 mWh/cm³. In some embodiments, the supercapacitor has a volumetric energy density of at most about 6 mWh/cm³. In some embodiments, the supercapacitor has a volumetric energy density of about 0.5 mWh/cm³ to about 1 mWh/cm³, about 0.5 mWh/cm³ to about 1.5 mWh/cm³, about 0.5 mWh/cm³ to about 2 mWh/cm³, about 0.5 mWh/cm³ to about 2.5 mWh/cm³, about 0.5 mWh/cm³ to about 3 mWh/cm³, about 0.5 mWh/cm³ to about 3.5 mWh/cm³, about 0.5 mWh/cm³ to about 4 mWh/cm³, about 0.5 mWh/cm³ to about 4.5 mWh/cm³, about 0.5 mWh/cm³ to about 5 mWh/cm³, about 0.5 mWh/cm³ to about 5.5 mWh/cm³, about 0.5 mWh/cm³ to about 6 mWh/cm³, about 1 mWh/cm³ to about 1.5 mWh/cm³, about 1 mWh/cm³ to about 2 mWh/cm³, about 1 mWh/cm³ to about 2.5 mWh/cm³, about 1 mWh/cm³ to about 3 mWh/cm³, about 1 mWh/cm³ to about 3.5 mWh/cm³, about 1 mWh/cm³ to about 4 mWh/cm³, about 1 mWh/cm³ to about 4.5 mWh/cm³, about 1 mWh/cm³ to about 5 mWh/cm³, about 1 mWh/cm³ to about 5.5 mWh/cm³, about 1 mWh/cm³ to about 6 mWh/cm³, about 1.5 mWh/cm³ to about 2 mWh/cm³, about 1.5 mWh/cm³ to about 2.5 mWh/cm³, about 1.5 mWh/cm³ to about 3 mWh/cm³, about 1.5 mWh/cm³ to about 3.5 mWh/cm³, about 1.5 mWh/cm³ to about 4 mWh/cm³, about 1.5 mWh/cm³ to about 4.5 mWh/cm³, about 1.5 mWh/cm³ to about 5 mWh/cm³, about 1.5 mWh/cm³ to about 5.5 mWh/cm³, about 1.5 mWh/cm³ to about 6 mWh/cm³, about 2 mWh/cm³ to about 2.5 mWh/cm³, about 2 mWh/cm³ to about 3 mWh/cm³, about 2 mWh/cm³ to about 3.5 mWh/cm³, about 2 mWh/cm³ to about 4 mWh/cm³, about 2 mWh/cm³ to about 4.5 mWh/cm³, about 2 mWh/cm³ to about 5 mWh/cm³, about 2 mWh/cm³ to about 5.5 mWh/cm³, about 2 mWh/cm³ to about 6 mWh/cm³, about 2.5 mWh/cm³ to about 3 mWh/cm³, about 2.5 mWh/cm³ to about 3.5 mWh/cm³, about 2.5 mWh/cm³ to about 4 mWh/cm³, about 2.5 mWh/cm³ to about 4.5 mWh/cm³, about 2.5 mWh/cm³ to about 5 mWh/cm³, about 2.5 mWh/cm³ to about 5.5 mWh/cm³, about 2.5 mWh/cm³ to about 6 mWh/cm³, about 3 mWh/cm³ to about 3.5 mWh/cm³, about 3 mWh/cm³ to about 4 mWh/cm³, about 3 mWh/cm³ to about 4.5 mWh/cm³, about 3 mWh/cm³ to about 5 mWh/cm³, about 3 mWh/cm³ to about 5.5 mWh/cm³, about 3 mWh/cm³ to about 6 mWh/cm³, about 3.5 mWh/cm³ to about 4 mWh/cm³, about 3.5 mWh/cm³ to about 4.5 mWh/cm³, about 3.5 mWh/cm³ to about 5 mWh/cm³, about 3.5 mWh/cm³ to about 5.5 mWh/cm³, about 3.5 mWh/cm³ to about 6 mWh/cm³, about 4 mWh/cm³ to about 4.5 mWh/cm³, about 4 mWh/cm³ to about 5 mWh/cm³, about 4 mWh/cm³ to about 5.5 mWh/cm³, about 4 mWh/cm³ to about 6 mWh/cm³, about 4.5 mWh/cm³ to about 5 mWh/cm³, about 4.5 mWh/cm³ to about 5.5 mWh/cm³, about 4.5 mWh/cm³ to about 6 mWh/cm³, about 5 mWh/cm³ to about 5.5 mWh/cm³, about 5 mWh/cm³ to about 6 mWh/cm³, or about 5.5 mWh/cm³ to about 6 mWh/cm³. In some embodiments, the supercapacitor has a volumetric energy density of about 0.5 mWh/cm³, about 1 mWh/cm³, about 1.5 mWh/cm³, about 2 mWh/cm³, about 2.5 mWh/cm³, about 3 mWh/cm³, about 3.5 mWh/cm³, about 4 mWh/cm³, about 4.5 mWh/cm³, about 5 mWh/cm³, about 5.5 mWh/cm³, or about 6 mWh/cm³.

In some embodiments, the supercapacitor has a power density of about 1 W/cm³ to about 6 W/cm³. In some embodiments, the supercapacitor has a power density of at least about 1 W/cm³. In some embodiments, the supercapacitor has a power density of at most about 6 W/cm³. In some embodiments, the supercapacitor has a power density of about 1 W/cm³ to about 1.5 W/cm³, about 1 W/cm³ to about 2 W/cm³, about 1 W/cm³ to about 2.5 W/cm³, about 1 W/cm³ to about 3 W/cm³, about 1 W/cm³ to about 3.5 W/cm³, about 1 W/cm³ to about 4 W/cm³, about 1 W/cm³ to about 4.5 W/cm³, about 1 W/cm³ to about 5 W/cm³, about 1 W/cm³ to about 5.5 W/cm³, about 1 W/cm³ to about 6 W/cm³, about 1.5 W/cm³ to about 2 W/cm³, about 1.5 W/cm³ to about 2.5 W/cm³, about 1.5 W/cm³ to about 3 W/cm³, about 1.5 W/cm³ to about 3.5 W/cm³, about 1.5 W/cm³ to about 4 W/cm³, about 1.5 W/cm³ to about 4.5 W/cm³, about 1.5 W/cm³ to about 5 W/cm³, about 1.5 W/cm³ to about 5.5 W/cm³, about 1.5 W/cm³ to about 6 W/cm³, about 2 W/cm³ to about 2.5 W/cm³, about 2 W/cm³ to about 3 W/cm³, about 2 W/cm³ to about 3.5 W/cm³, about 2 W/cm³ to about 4 W/cm³, about 2 W/cm³ to about 4.5 W/cm³, about 2 W/cm³ to about 5 W/cm³, about 2 W/cm³ to about 5.5 W/cm³, about 2 W/cm³ to about 6 W/cm³, about 2.5 W/cm³ to about 3 W/cm³, about 2.5 W/cm³ to about 3.5 W/cm³, about 2.5 W/cm³ to about 4 W/cm³, about 2.5 W/cm³ to about 4.5 W/cm³, about 2.5 W/cm³ to about 5 W/cm³, about 2.5 W/cm³ to about 5.5 W/cm³, about 2.5 W/cm³ to about 6 W/cm³, about 3 W/cm³ to about 3.5 W/cm³, about 3 W/cm³ to about 4 W/cm³, about 3 W/cm³ to about 4.5 W/cm³, about 3 W/cm³ to about 5 W/cm³, about 3 W/cm³ to about 5.5 W/cm³, about 3 W/cm³ to about 6 W/cm³, about 3.5 W/cm³ to about 4 W/cm³, about 3.5 W/cm³ to about 4.5 W/cm³, about 3.5 W/cm³ to about 5 W/cm³, about 3.5 W/cm³ to about 5.5 W/cm³, about 3.5 W/cm³ to about 6 W/cm³, about 4 W/cm³ to about 4.5 W/cm³, about 4 W/cm³ to about 5 W/cm³, about 4 W/cm³ to about 5.5 W/cm³, about 4 W/cm³ to about 6 W/cm³, about 4.5 W/cm³ to about 5 W/cm³, about 4.5 W/cm³ to about 5.5 W/cm³, about 4.5 W/cm³ to about 6 W/cm³, about 5 W/cm³ to about 5.5 W/cm³, about 5 W/cm³ to about 6 W/cm³, or about 5.5 W/cm³ to about 6 W/cm³. In some embodiments, the supercapacitor has a power density of about 1 W/cm³, about 1.5 W/cm³, about 2 W/cm³, about 2.5 W/cm³, about 3 W/cm³, about 3.5 W/cm³, about 4 W/cm³, about 4.5 W/cm³, about 5 W/cm³, about 5.5 W/cm³, or about 6 W/cm³.

In some embodiments, the supercapacitor has a gravimetric energy density of about 18 Wh/kg to about 21 Wh/kg. In some embodiments, the supercapacitor has a gravimetric energy density of at least about 18 Wh/kg. In some embodiments, the supercapacitor has a gravimetric energy density of at most about 21 Wh/kg. In some embodiments, the supercapacitor has a gravimetric energy density of about 18 Wh/kg to about 18.5 Wh/kg, about 18 Wh/kg to about 19 Wh/kg, about 18 Wh/kg to about 19.5 Wh/kg, about 18 Wh/kg to about 20 Wh/kg, about 18 Wh/kg to about 20.5 Wh/kg, about 18 Wh/kg to about 21 Wh/kg, about 18.5 Wh/kg to about 19 Wh/kg, about 18.5 Wh/kg to about 19.5 Wh/kg, about 18.5 Wh/kg to about 20 Wh/kg, about 18.5 Wh/kg to about 20.5 Wh/kg, about 18.5 Wh/kg to about 21 Wh/kg, about 19 Wh/kg to about 19.5 Wh/kg, about 19 Wh/kg to about 20 Wh/kg, about 19 Wh/kg to about 20.5 Wh/kg, about 19 Wh/kg to about 21 Wh/kg, about 19.5 Wh/kg to about 20 Wh/kg, about 19.5 Wh/kg to about 20.5 Wh/kg, about 19.5 Wh/kg to about 21 Wh/kg, about 20 Wh/kg to about 20.5 Wh/kg, about 20 Wh/kg to about 21 Wh/kg, or about 20.5 Wh/kg to about 21 Wh/kg. In some embodiments, the supercapacitor has a gravimetric energy density of about 18 Wh/kg, about 18.5 Wh/kg, about 19 Wh/kg, about 19.5 Wh/kg, about 20 Wh/kg, about 20.5 Wh/kg, or about 21 Wh/kg.

In some embodiments, the supercapacitor has a power density of about 3,000 W/kg to about 12,000 W/kg. In some embodiments, the supercapacitor has a power density of at least about 3,000 W/kg. In some embodiments, the supercapacitor has a power density of at most about 12,000 W/kg. In some embodiments, the supercapacitor has a power density of about 3,000 W/kg to about 4,000 W/kg, about 3,000 W/kg to about 5,000 W/kg, about 3,000 W/kg to about 6,000 W/kg, about 3,000 W/kg to about 7,000 W/kg, about 3,000 W/kg to about 8,000 W/kg, about 3,000 W/kg to about 9,000 W/kg, about 3,000 W/kg to about 10,000 W/kg, about 3,000 W/kg to about 11,000 W/kg, about 3,000 W/kg to about 12,000 W/kg, about 4,000 W/kg to about 5,000 W/kg, about 4,000 W/kg to about 6,000 W/kg, about 4,000 W/kg to about 7,000 W/kg, about 4,000 W/kg to about 8,000 W/kg, about 4,000 W/kg to about 9,000 W/kg, about 4,000 W/kg to about 10,000 W/kg, about 4,000 W/kg to about 11,000 W/kg, about 4,000 W/kg to about 12,000 W/kg, about 5,000 W/kg to about 6,000 W/kg, about 5,000 W/kg to about 7,000 W/kg, about 5,000 W/kg to about 8,000 W/kg, about 5,000 W/kg to about 9,000 W/kg, about 5,000 W/kg to about 10,000 W/kg, about 5,000 W/kg to about 11,000 W/kg, about 5,000 W/kg to about 12,000 W/kg, about 6,000 W/kg to about 7,000 W/kg, about 6,000 W/kg to about 8,000 W/kg, about 6,000 W/kg to about 9,000 W/kg, about 6,000 W/kg to about 10,000 W/kg, about 6,000 W/kg to about 11,000 W/kg, about 6,000 W/kg to about 12,000 W/kg, about 7,000 W/kg to about 8,000 W/kg, about 7,000 W/kg to about 9,000 W/kg, about 7,000 W/kg to about 10,000 W/kg, about 7,000 W/kg to about 11,000 W/kg, about 7,000 W/kg to about 12,000 W/kg, about 8,000 W/kg to about 9,000 W/kg, about 8,000 W/kg to about 10,000 W/kg, about 8,000 W/kg to about 11,000 W/kg, about 8,000 W/kg to about 12,000 W/kg, about 9,000 W/kg to about 10,000 W/kg, about 9,000 W/kg to about 11,000 W/kg, about 9,000 W/kg to about 12,000 W/kg, about 10,000 W/kg to about 11,000 W/kg, about 10,000 W/kg to about 12,000 W/kg, or about 11,000 W/kg to about 12,000 W/kg. In some embodiments, the supercapacitor has a power density of about 3,000 W/kg, about 4,000 W/kg, about 5,000 W/kg, about 6,000 W/kg, about 7,000 W/kg, about 8,000 W/kg, about 9,000 W/kg, about 10,000 W/kg, about 11,000 W/kg, or about 12,000 W/kg.

In some embodiments, the supercapacitor has capacity retention after 7,000 cycles of about 30% to about 80%. In some embodiments, the supercapacitor has capacity retention after 7,000 cycles of at least about 30%. In some embodiments, the supercapacitor has capacity retention after 7,000 cycles of at most about 80%. In some embodiments, the supercapacitor has capacity retention after 7,000 cycles of about 80% to about 75%, about 80% to about 70%, about 80% to about 65%, about 80% to about 60%, about 80% to about 55%, about 80% to about 50%, about 80% to about 45%, about 80% to about 40%, about 80% to about 35%, about 80% to about 30%, about 75% to about 70%, about 75% to about 65%, about 75% to about 60%, about 75% to about 55%, about 75% to about 50%, about 75% to about 45%, about 75% to about 40%, about 75% to about 35%, about 75% to about 30%, about 70% to about 65%, about 70% to about 60%, about 70% to about 55%, about 70% to about 50%, about 70% to about 45%, about 70% to about 40%, about 70% to about 35%, about 70% to about 30%, about 65% to about 60%, about 65% to about 55%, about 65% to about 50%, about 65% to about 45%, about 65% to about 40%, about 65% to about 35%, about 65% to about 30%, about 60% to about 55%, about 60% to about 50%, about 60% to about 45%, about 60% to about 40%, about 60% to about 35%, about 60% to about 30%, about 55% to about 50%, about 55% to about 45%, about 55% to about 40%, about 55% to about 35%, about 55% to about 30%, about 50% to about 45%, about 50% to about 40%, about 50% to about 35%, about 50% to about 30%, about 45% to about 40%, about 45% to about 35%, about 45% to about 30%, about 40% to about 35%, about 40% to about 30%, or about 35% to about 30%. In some embodiments, the supercapacitor has capacity retention after 7,000 cycles of about 80%, about 75%, about 70%, about 65%, about 60%, about 55%, about 50%, about 45%, about 40%, about 35%, or about 30%.

In another aspect, the present disclosure provides processes, methods, protocols and the like for manufacturing high energy storage devices, such as supercapacitors comprising at least one laser-scribed activated carbon electrode. In further embodiments, the supercapacitor comprises redox active electrolytes. In some embodiments, the use of redox active electrolytes increases the capacitance of the high energy storage devices. In certain embodiments, the increase in the capacitance of the high energy storage devices reduces the cost of the high energy storage device.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

FIG. 1A provides an exemplary design and structure of laser scribed activated carbon (LSAC) electrodes, in accordance with some embodiments. This schematic illustration shows the fabrication process of laser modified activated carbon (LAC) electrodes. The laser treated electrodes contain trenches that serve as electrolyte reservoirs, enabling better interaction between the electrolyte ions and the electrode surfaces. In some embodiments, the fabrication process comprises receiving an activated carbon substrate; casting the activated carbon substrate on a current collector having a carbon-based coating; generating a light beam having a power density to generate one or more channels in the activated carbon substrate, thereby creating an activated carbon-based electrode comprising one or more channels.

FIG. 1B is an overview SEM image showing activated carbon before exposure to the laser.

FIG. 1C is an SEM image showing the ~100 µm patterns on activated carbon electrode after exposure to 7-W laser.

FIG. 1D is a magnified view illustrating that some parts of activated carbon particles are etched out by laser leading to macroporous structure.

FIG. 6G shows a Ragone plot showing the gravimetric energy density and power density of 0.1 M RE-LSAC system and other RE-based supercapacitors reported in the literature.

FIG. 6I is another Ragone plot comparing the volumetric energy density and power density of the 0.1 M RE-LSAC supercapacitor with commercially available energy storage devices.

FIG. 6I shows the long-term cycling stability of 0.1 M RE-LSAC supercapacitor at 2.0 V.

FIG. 7A shows charge/discharge (CC) curves of supercapacitors with LSAC electrodes at 20 mAcm$^{-2}$ of the activated carbon supercapacitor with 0.025 M, 0.050 M, 0.100 M, and 0.200 M redox-active electrolyte [Fe(CN)$_6^{3-}$/Fe(CN)$_6^{4-}$] in 1.0 M Na$_2$SO$_4$ electrolyte.

FIG. 7B provides the areal capacitance of device and columbic efficiency of supercapacitors with LSAC electrodes at different concentrations of redox-active electrolyte are listed. Values calculated based on the CC results at 20 mA cm$^{-2}$.

DETAILED DESCRIPTION

Figures 2A, 2B:
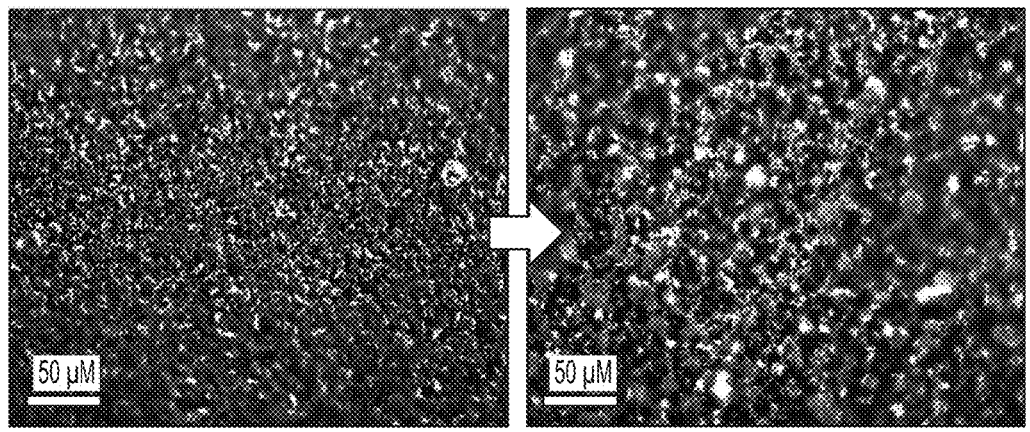
FIG. 2A provides an exemplary optical microscope image before laser scribing showing the microstructure of an as-made LSAC electrode processed from PVDF binder.
FIG. 2B provides an exemplary optical microscope image after laser scribing showing the microstructure of an LSAC electrode processed from PVDF binder. The results reveal the appearance of macro-pores in the structure of the electrode following the laser treatment.
Figures 2C, 2D:
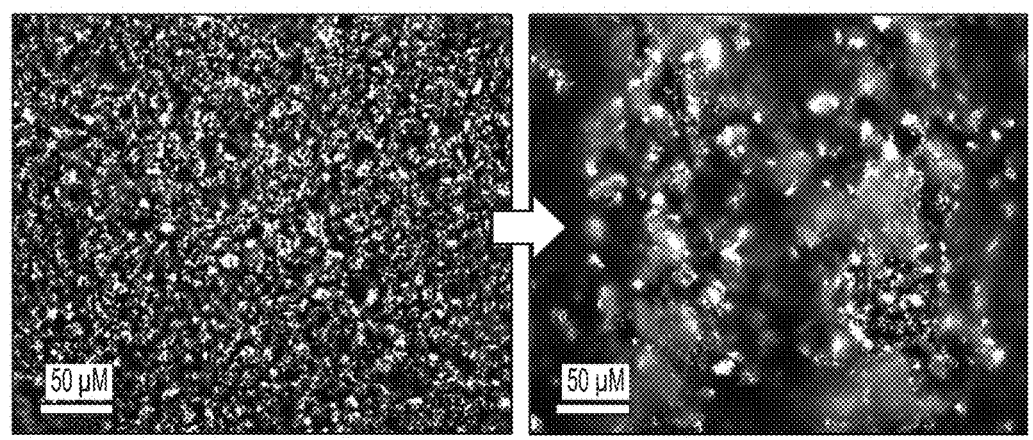
FIG. 2C provides an exemplary optical microscope image before laser scribing showing the microstructure of an as-made LSAC electrode processed from CMC/SBR binder.
FIG. 2D provides an exemplary optical microscope image after laser scribing showing the microstructure of an LSAC electrode processed from CMC/SBR binder. The results reveal the appearance of macro-pores in the structure of the electrode following the laser treatment.

In one aspect, the present disclosure describes carbon-based electrodes. In some embodiments, the electrodes comprise a carbon-coated current collector. In some embodiments the carbon-coated current collector comprises an activated carbon substrate. In some embodiments, the carbon-coated current collector can be laser-irradiated to form the activated carbon substrate. In some embodiments, the carbon-based electrode comprising a current collector and an activated carbon substrate can comprise one or more micro-channels. In some embodiments, the carbon-based electrodes comprising micro-channels may exhibit a high capacitance. In some embodiments, the carbon-based electrodes comprising micro-channels may exhibit a low internal resistance.

In some embodiments, the activated carbon substrate comprises chemically and/or physically activated carbon, carbon cloth, carbon fiber, glassy carbon, carbon nanofoam, carbon aerogel, or combinations thereof. In certain embodiments, the activated carbon substrate comprises activated carbon cloth. In some embodiments, the activated carbon substrate is derived from coconut shells.

In some embodiments, the current collector is metallic. In some embodiments, the current collector comprises aluminum, nickel, copper, platinum, steel, or combinations thereof. In certain embodiments, the current collector comprises aluminum.

In some embodiments, the current collector is non-metallic. In some embodiments, the current collector comprises graphite paper, carbon cloth, or any combination thereof.

In some embodiments, the carbon-based electrode comprises one or more channels. In some embodiments, the one or more channels have a pore size from about 50 nanometers to about 500 micrometers. In some embodiments, the one or more micro-channels have a pore size of about 100 micrometers.

In some embodiments, the carbon-based electrode can have an areal capacitance of from about 50 mF/cm$^2$ to about 800 mF/cm$^2$. In some embodiments, the carbon-based electrode can have an areal capacitance of at least about 50 mF/cm$^2$. In some embodiments, the carbon-based electrode can have an areal capacitance of at most about 800 mF/cm$^2$.

In some embodiments, the carbon-based electrode may exhibit a gravimetric capacitance of from about 80 F/g to about 150 F/g. In some embodiments, the carbon-based electrode can have a gravimetric capacitance of at least about 80 F/g. In some embodiments, the carbon-based electrode can have a gravimetric capacitance of at most about 150 F/g.

In some embodiments, the carbon-based electrode may exhibit a packing density from about 0.1 g/cm$^3$ to about 1.0 g/cm$^3$. In some embodiments, the carbon-based electrode may exhibit a packing density of about 0.5 g/cm$^3$. In some embodiments, the carbon-based electrode may exhibit a packing density of about 0.6 g/cm$^3$.

FIG. 1 provides an exemplary design, structure, and characterization of laser scribed activated carbon (LSAC) electrodes. In this exemplary embodiment, activated carbon electrodes with a high packing density of about 0.60 g cm$^{-3}$ are fabricated on a carbon coated aluminum current collector using a standard doctor blade coating technique. The exposure of the electrode to a CO$_2$ laser results in the formation of microscale size trenches as illustrated in FIG. 1A. FIG. 1A is a schematic illustration showing the fabrication process of laser modified activated carbon (LAC) electrodes. The laser treated electrodes contain trenches that serve as electrolyte reservoirs, enabling better interaction between the electrolyte ions and the electrode surfaces. FIG. 1B and FIG. 1C show the changes of the microstructure of the electrode before and after laser irradiation. FIG. 1B is an overview SEM image showing activated carbon before exposure to the laser. FIG. 1C is an SEM image showing the ~100 μm patterns on activated carbon electrode after exposure to 7-W laser. Zooming into the laser treated electrode reveals the macroporous nature of the electrode, FIG. 1D. FIG. 1D is a magnified view illustrating that some parts of activated carbon particles are etched out by laser leading to macroporous structure. The results per FIGS. 1A-D were further confirmed by the optical microscopy images indicating the appearance of macropores in the structure of the electrode following laser irradiation, per FIGS. 2A-D.

The same results are obtained when processing the electrode from an organic system with PVDF binder and aqueous system with CMC/SBR binder. This unique electrode architecture exhibits a high surface area and porous structure, allowing the electrolyte to interact with the entire surface of the activated materials. In addition, microscale trenches may allow for the rapid transportation of ions and may provide an ionic connection between the interior pores of the activated carbon particles and the external electrolyte. These trenches may also reduce the distance over which the ions will have to move during charge and discharge processes. An additional advantage of this technique is that the exemplary electrode may maintain its high packing density after laser irradiation (~0.54 g cm$^{-3}$). Therefore, the laser irradiation technique proposed in this work may enable the direct fabrication of high power/high energy activated carbon electrodes without compromising their outstanding volumetric performance. In addition, the microscale trenches may help alleviate the strain and stress between particles during charge and discharge and may improve the cycling stability of the supercapacitor.

In one aspect, the present disclosure provides high energy storage devices, such as supercapacitors, comprising at least one LSAC electrode and an aqueous electrolyte.

In some embodiments, the supercapacitor comprises laser scribed activated carbon (LSAC) electrodes in a CR2032 coin cell devices and 1 M tetraethylammonium tetrafluoroborate (TEABF$_4$) in acetonitrile as the electrolyte, per FIG. 3.

Figure 3C:
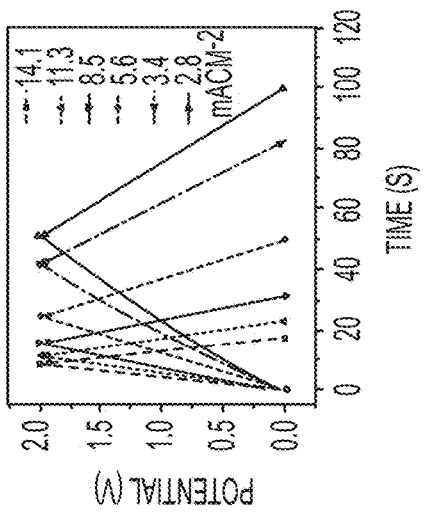
FIG. 3C provides exemplary charge/discharge (CC) curves of LSAC supercapacitors in a traditional 1.0 M tetraethylammonium tetrafluoroborate ($TEABF_4$) in acetonitrile (ACN) electrolyte at different current densities 2.8, 3.4, 5.6, 8.5, 11.3, and 14.1 mA cm$^{-2}$. All the values were measure from the full cell and calculated based on the electrode.
Figure 3B:
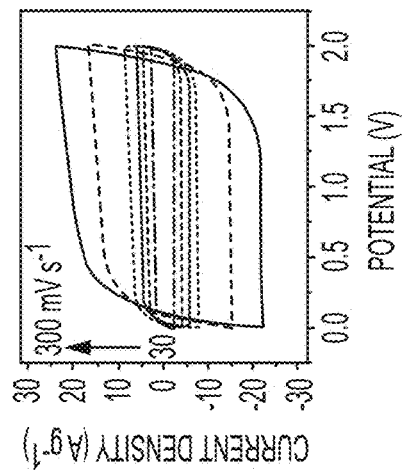
FIG. 3B provides exemplary CV profiles of LAC supercapacitor in a traditional 1.0 M tetraethylammonium tetrafluoroborate ($TEABF_4$) in acetonitrile (ACN) electrolyte at different scan rates of 30, 50, 70, 100, 200, and 300 mV s$^{-1}$. All the values were measure from the full cell and calculated based on the electrode.
Figure 3A:
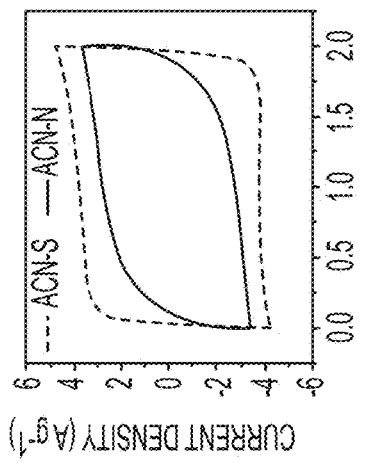
FIG. 3A provides cyclic voltammetry (CV) curves of LSAC supercapacitors in a traditional 1.0 M tetraethylammonium tetrafluoroborate ($TEABF_4$) in acetonitrile (ACN) electrolyte before (solid line) and after (dashed line) laser treatment, obtained at a scan rate of 50 mV s$^{-1}$. All the values were measure from the full cell and calculated based on the electrode.
Figure 3F:
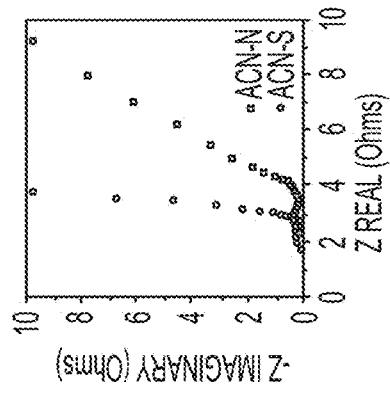
FIG. 3F shows Nyquist plots of the LAC supercapacitor and non-scribed supercapacitors over a frequency range of 1 MHz to 0.1 Hz.
Figure 3E:
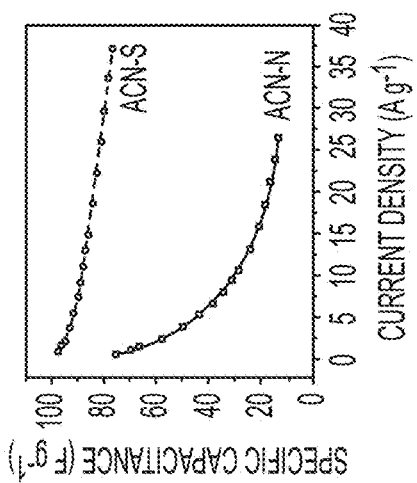
FIG. 3E provides gravimetric capacitance retention of LSAC supercapacitors in a traditional 1.0 M tetraethylammonium tetrafluoroborate ($TEABF_4$) in acetonitrile (ACN) electrolyte before (ACN-N) and after (ACN-S) laser treatment as a function of the applied current density. All the values were measure from the full cell and calculated based on the electrode.
Figure 3D:
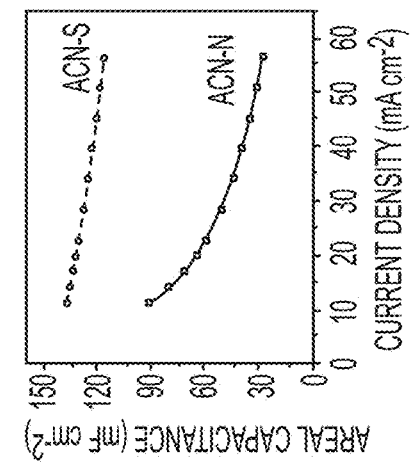
FIG. 3D provides the areal capacitance retention of LSAC supercapacitors in a traditional 1.0 M tetraethylammonium tetrafluoroborate ($TEABF_4$) in acetonitrile (ACN) electrolyte before (ACN-N) and after (ACN-S) laser treatment as a function of the applied current density. All the values were measure from the full cell and calculated based on the electrode. All the values were measure from the full cell and calculated based on the electrode.

FIGS. 3A-D provide exemplary evaluations of the electrochemical performance of laser modified activated carbon (LAC) supercapacitors in a traditional 1.0 M tetraethylammonium tetrafluoroborate (TEABF$_4$) in acetonitrile (ACN) electrolyte. FIG. 3A shows an exemplary cyclic voltammetry (CV) of the LSAC electrode before and after laser irradiation. In comparison with a non-scribed electrode, the exemplary LSAC shows an enhanced capacitance with ideal rectangular CV curve at a scan rate of 50 mV s$^{-1}$. This suggests the ideal electric double layer capacitance behavior. This ideal rectangular CV shape of the exemplary LSAC supercapacitor is retained even when tested at high scan rates up to 300 mV s$^{-1}$ as shown in FIG. 3B. FIG. 3B provides exemplary CV profiles of LAC supercapacitor at different scan rates of 30, 50, 70, 100, 200, and 300 mV s$^{-1}$. In addition, FIG. 3C shows that the exemplary device can maintain ideal triangular charge/discharge (CC) curves with very small IR drop at increasing current densities. FIG. 3C provides exemplary charge/discharge (CC) curves at different current densities 2.8, 3.4, 5.6, 8.5, 11.3, and 14.1 mA cm$^{-2}$. Based on these measurements, the areal capacitances and gravimetric capacitances were calculated, as shown in FIG. 3D and FIG. 3E, respectively, of the electrode at different current densities. FIG. 3D shows the areal capacitance retention and FIG. 3E provides gravimetric capacitance retention of before and after laser treatment as a function of the applied current density. All the values were measure from the full cell and calculated based on the electrode. Although some active materials were destroyed during the laser scribing the microscale trenches, the LSAC electrode exhibits better capacitance on both scales, and from both a gravimetric and an areal basis. In addition, the exemplary LSAC electrode exhibits an excellent rate capability with capacitance retention up to a current density of 25 A g$^{-1}$ at which the exemplary LSAC electrode delivers 6 times larger capacitance compared to the non-scribed electrode. The excellent rate capability of the exemplary LSAC electrode is further verified by the electrochemical impedance measurements. The results indicate that the LSAC electrode exhibits a lower equivalent series resistance (ESR), obtained from the real axis intercept of the Nyquist plot as shown in FIG. 3F. FIG. 3F provides exemplary Nyquist plots of the LAC supercapacitor and non-scribed supercapacitors over a frequency range of 1 MHz to 0.1 Hz. In addition, the Nyquist plot of the exemplary LSAC electrode is a straight and vertical in the low frequency region, possibly indicating ideal capacitive behavior. These results may imply low charge transfer resistance at the electrode/electrolyte interface and may suggest rapid electron and ion transport within the LSAC electrode. This may be ascribed to the large macroporous surfaces of the electrode that are easily accessible to the electrolyte ions.

In another aspect, the present disclosure provides for supercapacitors comprising redox electrolytes. In some embodiments, the redox electrolyte comprises a ferricyanide/ferrocyanide electrolyte, which adds more capacitance to the cell and allows operation at a high voltage of 2.0 V in an aqueous electrolyte. In some embodiments, the supercapacitor comprises aluminum current collectors, which are used in the manufacturing of supercapacitors and lithium ion batteries.

Figure 4:
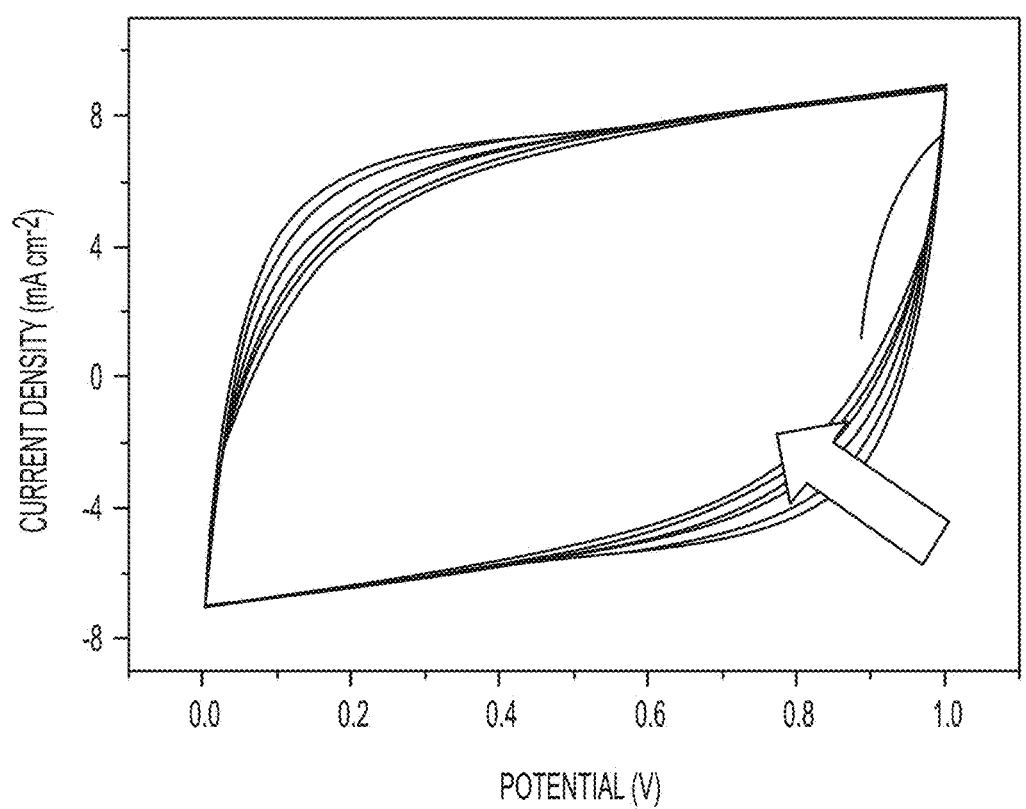
FIG. 4 provides exemplary cyclic voltammetry of an LSAC electrode, in accordance with some embodiments. In the embodiment, the cyclic voltammetry (CV) is for activated carbon electrode (prepared on aluminum current collector) in 1.0 M $Na_2SO_4$ measured at 50 mV s$^{-1}$ and repeated for 6 cycles. The device was assembled and tested in a CR 2032 coin cell.

In some embodiments, the supercapacitor comprises a supercapacitor coin cell comprising activated carbon electrodes coated on aluminum and an aqueous 1.0 M Na$_2$SO$_4$ electrolyte without any redox additives. FIG. 4 shows exemplary voltammetry (CV) of activated carbon electrode (prepared on aluminum current collector) in 1.0 M Na$_2$SO$_4$ measured at 50 mV s$^{-1}$ and repeated for 6 cycles. The device was assembled and tested in a CR 2032 coin cell. The figure shows the rapidly changing CV profiles associated with an increase of the ESR after each cycle, which may suggest the corrosion of the aluminum in 1.0 M Na$_2$SO$_4$.

In some embodiments, the supercapacitor comprises a supercapacitor coin cell comprising activated carbon electrodes coated on aluminum and aqueous 1.0 M Na$_2$SO$_4$ electrolyte with [Fe(CN)$_6^{3-}$/Fe(CN)$_6^{4-}$] redox additive. The supercapacitor exhibits a very stable electrochemical performance even at a high voltage of 2.0 V. A possible explanation is that [Fe(CN)$_6^{3-}$/Fe(CN)$_6^{4-}$] works as a solution buffer and maintains a neutral pH (7.1) during charging and discharging. Note that 1.0 M Na$_2$SO$_4$ has a pH of 6. It is also possible that the redox additive acts as a sacrificial anode and thus protects the aluminum from corrosion.

FIG. 5 shows the exemplary electrochemical performances of coin cell activated carbon supercapacitors at different concentrations of the redox additive in 1.0 M Na$_2$SO$_4$, briefly denoted as x M RE, where x is the molar concentration of the additive. FIG. 5A presents exemplary CV profiles collected with 0.1 M RE at an increasing voltage window from 1 V to 2 V with an interval of 0.2 V and a scan rate 50 mV s$^{-1}$. The CV profiles show no significant increase in the current, especially in the high voltage end, which signifies that there is no decomposition of the electrolyte, and suggests that 2.0 V can be safely applied to a supercapacitor operating in this electrolyte. Both Na$^+$ and SO$_4^{2-}$ ions have strong solvation energy which stems from the fact that sulfate ions can be surrounded by 12-16 molecules of water. Therefore, it is possible to assume that the energy that causes the decomposition of water in traditional aqueous electrolytes is now used to break the bonds in the solvation shell of Na$^+$ and SO$_4^{2-}$ ions or even to drive redox reactions of the redox electrolyte. The combination of the ferrocyanide/ferricyanide redox couple with an electrolyte having high solvation energy can explain the electrochemical stability of the supercapacitor, even when tested at 2.0 V where water molecules would normally decompose. Moreover, FIG. 5A shows a reversible redox couple (between 0.6 V and 1.1 V) which may be attributed to the redox additive. This reaction is described in the following equation:

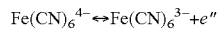

$$Fe(CN)_6^{4-} \leftrightarrow Fe(CN)_6^{3-} + e''$$

For the positive side, the electrolyte undergoes an oxidation process from Fe(CN)$_6^{4-}$ to Fe(CN)$_6^{3-}$ during charging course, while the discharging process induces a reduction process from Fe(CN)$_6^{3-}$ to Fe(CN)$_6^{4-}$.

Figure 5A:
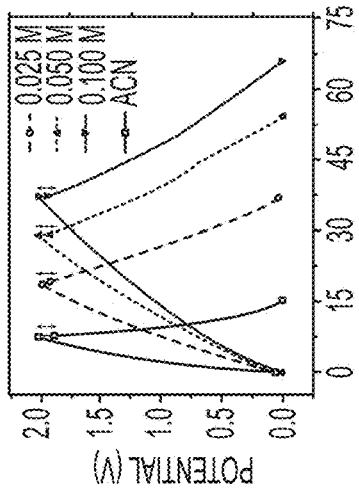
FIG. 5A shows CV curves of a high voltage supercapacitor in a redox-active aqueous electrolyte at an increasing voltage window from 1.0 V to 2.0 V in 0.1 M RE at 50 mV s$^{-1}$. All the electrochemical experiments were measured in a CR2032 coin cell.
Figure 5B:
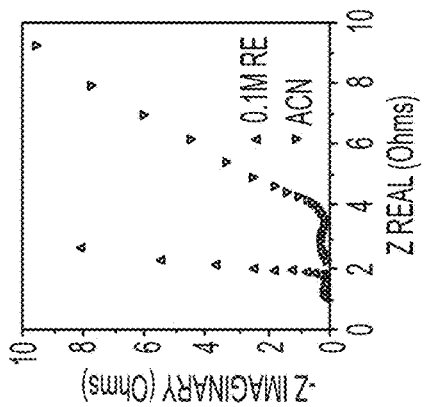
FIG. 5B shows CV curves of a high voltage supercapacitor in a redox-active aqueous electrolyte collected at increasing concentrations of the redox additive, tested at a scan rate of 50 mVs$^{-1}$. All the electrochemical experiments were measured in a CR2032 coin cell.
Figure 5C:
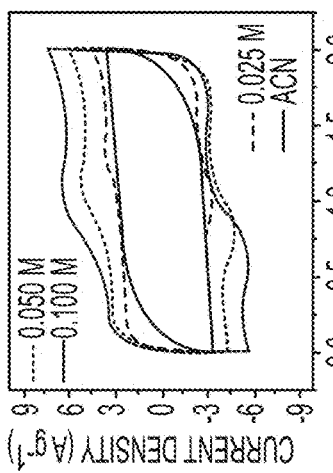
FIG. 5C shows the corresponding CC curves of a high voltage supercapacitor in a redox-active aqueous electrolyte for an activated carbon electrode in 1 M $Na_2SO_4$ containing different concentrations (0, 0.025, 0.050, and 0.100 M) of the redox additive collected at a current density of 11.3 mA cm$^{-2}$. All the electrochemical experiments were measured in a CR2032 coin cell.
Figure 5D:
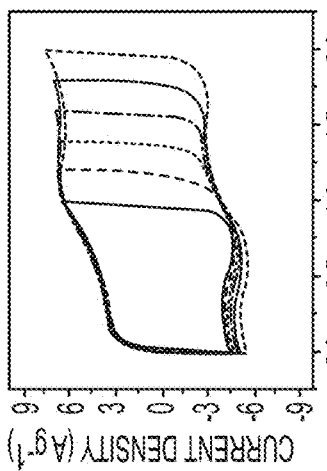
FIG. 5D shows the specific capacitance by area vs. current density for an activated carbon electrode in 1 M $Na_2SO_4$ containing different concentrations (0, 0.025, 0.050, and 0.100 M) of the redox additive. All the electrochemical experiments were measured in a CR2032 coin cell.
Figure 5E:
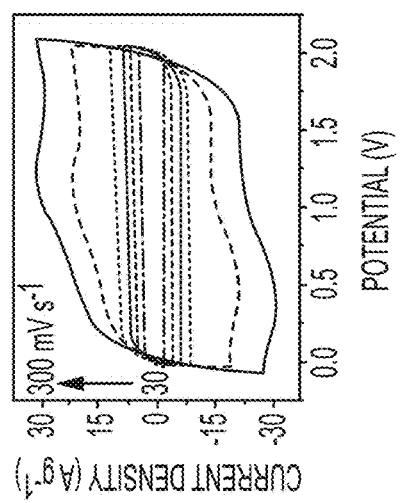
FIG. 5E provides exemplary CV profiles of 0.1M RE-SC at different scan rates of 30, 50, 70, 100, 200, and 300 mVs$^{-1}$. All the electrochemical experiments were measured in a CR2032 coin cell.
Figure 5F:
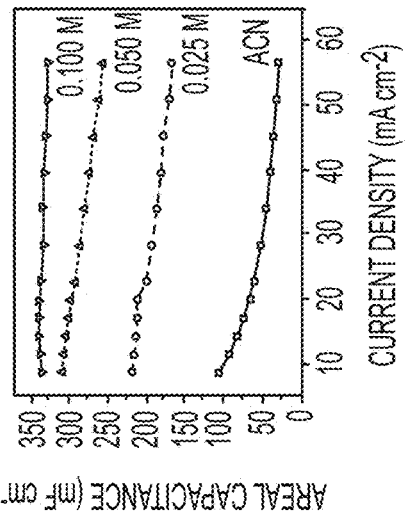
FIG. 5F are Nyquist plots of the 0.1 M RE aqueous electrolyte and 1.0 M $TEABF_4$ in ACN supercapacitors over a frequency range of 1 MHz to 0.1 Hz. All the electrochemical experiments were measured in a CR2032 coin cell.
Figure 8B:
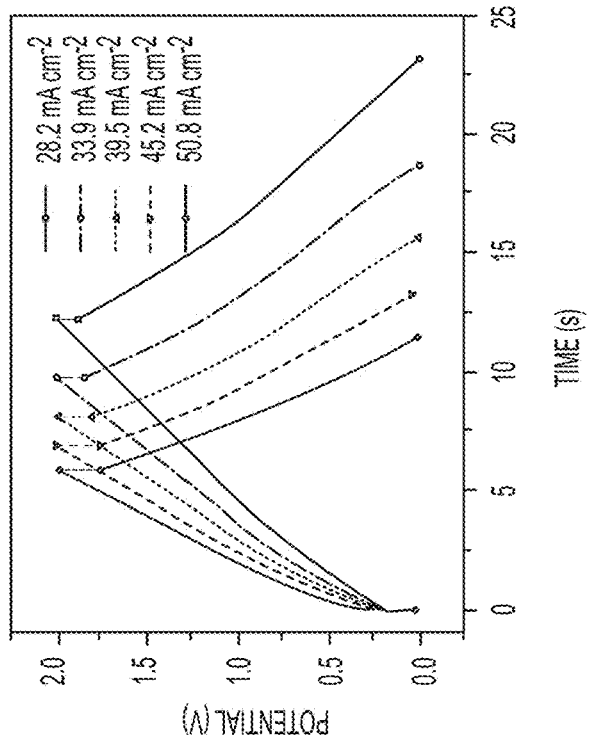
FIG. 8B shows the CC curves of activated carbon supercapacitor with 0.100 M redox-active electrolyte for current densities of 28.2, 33.9, 39.5, 45.2, and 50.8 mA cm$^{-2}$.
Figure 8A:
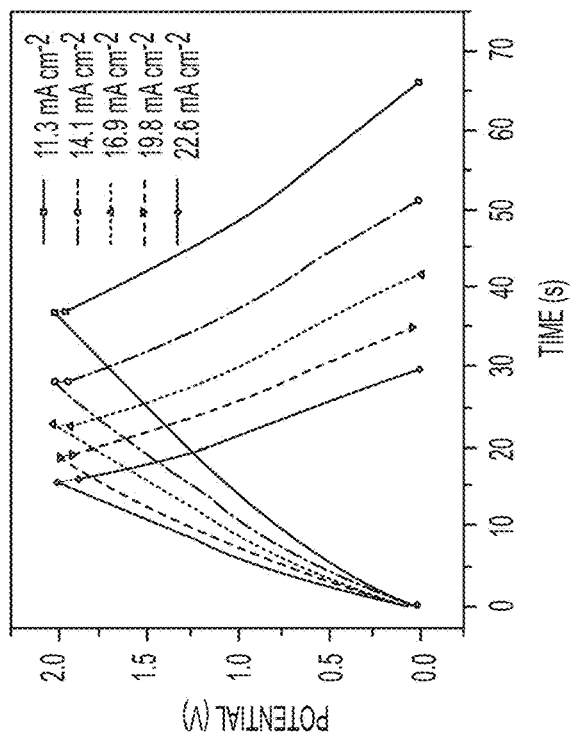
FIG. 8A shows CC curves of activated carbon supercapacitor with 0.100 M redox-active electrolyte at various current densities of 11.3, 14.1, 16.9, 19.8, and 22.6 mA cm$^{-2}$.

FIGS. 5B and 5C provide exemplary electrochemical performances of the supercapacitor comprising a redox electrolyte at various concentrations of the redox electrolyte (RE), namely 0.025 M, 0.05 M, and 0.1 M compared with a traditional acetonitrile-based electrolyte, at a scan rate of 50 mVs$^{-1}$. With increasing concentration of RE ions, the area under the CV curves as shown in FIG. 5B, and discharge time of the CC curves as shown in FIG. 5C increase, which indicates a specific capacitance increase. By increasing the concentration to 0.2 M, the cell showed a 1.2 times increase in capacitance compared to 0.1 M although the columbic efficiency dropped to 58% as shown in FIG. 7. The high leakage current at this high concentration may increase the time necessary for the device to reach 2.0 V during charging. According to these results, the 0.1 M RE system is down selected for further optimization of the overall supercapacitor performance. Not only does the 0.1 M RE system show the highest capacitance but also it has the best rate capability. FIG. 5D provides an exemplary specific capacitance by area vs. current density for an activated carbon electrode in 1 M Na$_2$SO$_4$ containing different concentrations (0, 0.025, 0.050, and 0.100 M) of the redox additive. The exemplary 0.1 M RE system shows an ultra-high areal capacitance of 335 mF cm$^{-2}$ at 8.5 mA cm$^{-2}$ and 325.2 mF cm$^{-2}$ at a higher current density of 56.5 mA cm$^{-2}$, which is 11.6 times larger than the standard 1.0 M TEABF$_4$ in ACN electrolyte as shown in FIG. 5D. FIG. 5E shows that the exemplary 0.1M RE device maintains ideal CV shapes at different scan rates of 30, 50, 70, 100, 200, and 300 mV s$^{-1}$. More importantly, the curves show distinct and reversible redox peaks at all the scan rates, which may indicate a rapid charge transfer between the electrodes and the redox electrolyte. In addition, this exemplary redox supercapacitor continues to provide high discharge currents with small IR drops, as shown in FIGS. 8A and 8B. These results may imply that the 0.1 M RE electrolyte promotes rapid electron transfer and an improved rate capability. This rapid electron transfer is further confirmed by the Nyquist plot per FIG. 3F, of the exemplary 0.1 M RE-SC system, whereas the ESR is much lower (1.61Ω) than the ACN electrolyte (3.52Ω). FIG. 3F provides exemplary Nyquist plots of the 0.1 M RE aqueous electrolyte and 1.0 M TEABF$_4$ in ACN supercapacitors over a frequency range of 1 MHz to 0.1 Hz. All the electrochemical experiments were measured in a CR2032 coin cell.

The addition of the RE electrolyte may have the following advantages: acting as a solution buffer to maintain a neutral pH, allowing the operation of the electrolyte with widely used aluminum current collectors; extending the operating voltage window up to 2 V in an aqueous electrolyte; increasing the energy density; increasing the areal capacitance of the device through fast and reversible faradaic reactions; providing for fast electron transfer and increased ion conductivity; allowing for a higher rate capability; and decreasing the ESR.

In one aspect, the present disclosure provides for carbon-based high energy storage devices such as supercapacitors, comprising at least one laser-scribed activated electrode and at least one redox electrolyte. In some embodiments, the carbon-based supercapacitor comprising at least one LSAC electrode and at least one redox electrolyte has a higher capacitance than a carbon-based supercapacitor without a redox electrolyte. In some embodiments, the carbon-based supercapacitor comprising at least one LSAC electrode and at least one redox electrolyte can operate at a high voltage of 2.0 V. In some embodiments, the carbon-based supercapacitor comprising at least one LSAC electrode and at least one redox electrolyte can have a high areal capacitance, high specific power, high specific energy, low ESR, or any combination thereof.

In some embodiments, the redox electrolyte comprises about 0.1M of a ferricyanide/ferrocyanide redox couple. In some embodiments, the carbon-based supercapacitor comprising redox electrolyte can have a capacitance of about 8-fold the capacitance of a carbon-based supercapacitor without a redox electrolyte.

In some embodiments, the carbon-based supercapacitor comprising at least one LSAC electrode and at least one redox electrolyte can have an areal capacitance of about 379 mF cm$^{-2}$. In some embodiments, the carbon-based supercapacitor comprising at least one LSAC electrode and at least one redox electrolyte can have an areal capacitance of at least about 360 mF cm$^{-2}$. In some embodiments, the carbon-based supercapacitor comprising at least one LSAC electrode and at least one redox electrolyte can have an areal capacitance of at most about 390 mF cm$^{-2}$.

In some embodiments, the carbon-based supercapacitor comprising at least one LSAC electrode and at least one redox electrolyte can have a specific power of about 5.26 W cm$^{-3}$. In some embodiments, the carbon-based supercapacitor comprising at least one LSAC electrode and at least one redox electrolyte can have a specific power of at least about 1.0 W cm$^{-3}$. In some embodiments, the carbon-based supercapacitor comprising at least one LSAC electrode and at least one redox electrolyte can have a specific power of at most about 6.0 W cm$^{-3}$.

In some embodiments, the carbon-based supercapacitor comprising at least one LSAC electrode and at least one redox electrolyte can have a specific energy about 9.05 mWh cm$^{-3}$. In some embodiments, the carbon-based supercapacitor comprising at least one LSAC electrode and at least one redox electrolyte can have a specific energy at least about 6 mWh cm$^{-3}$. In some embodiments, the carbon-based supercapacitor comprising at least one LSAC electrode and at least one redox electrolyte can have a specific energy at most about 10 mWh cm$^{-3}$.

In some embodiments, the carbon-based supercapacitor comprising at least one LSAC electrode and at least one redox electrolyte can have an ESR of about 0.9Ω. In some embodiments, the carbon-based supercapacitor comprising at least one LSAC electrode and at least one redox electrolyte can have an ESR of at least about 0.5Ω. In some embodiments, the carbon-based supercapacitor comprising at least one LSAC electrode and at least one redox electrolyte can have an ESR of at most about 4Ω.

Figure 6C:
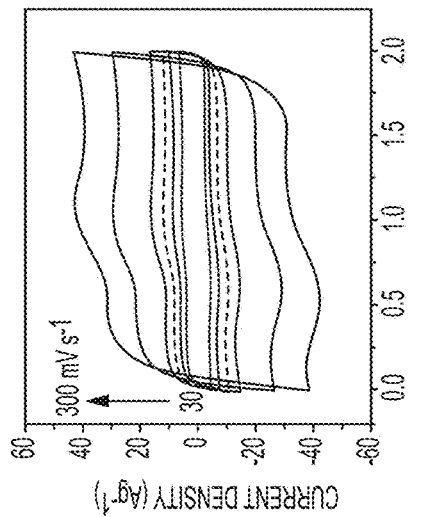
FIG. 6C shows the evolution of the electrochemical performance of LSAC supercapacitor using 0.1 M RE at different scan rates of CVs at 30, 50, 70, 100, 200 and 300 mVs$^{-1}$.
Figure 6B:
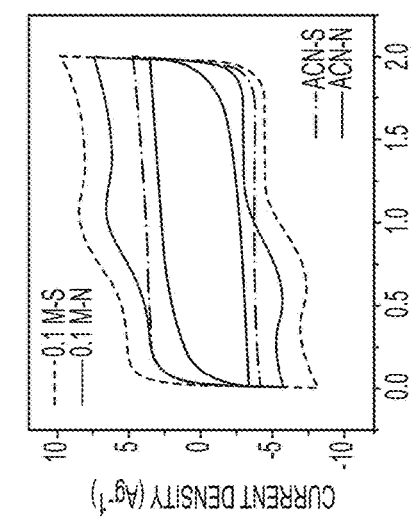
FIG. 6B shows CV profiles comparing the electrochemical performance of activated carbon electrodes before and after laser scribing tested in traditional 1.0 M in acetonitrile and in 0.1 M redox electrolyte, data collected at a scan rate of 50 mVs$^{-1}$.
Figure 6A:
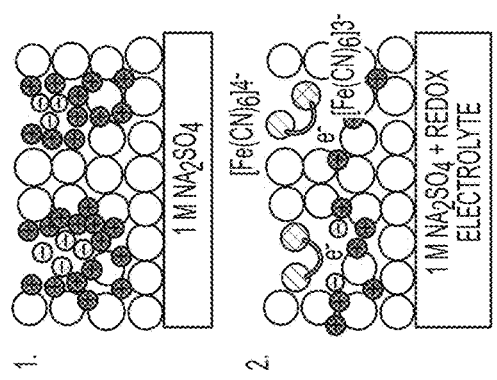
FIG. 6A is an illustration of the charge storage mechanism in LSAC electrode using 1.0 M $Na_2SO_4$ electrolyte (1) in the absence, and (2) in the presence of redox additive.

FIG. 6A-6I provide exemplary electrochemical performances of a supercapacitor comprising a combining at least one laser scribed activated carbon (LSAC) electrode and [Fe(CN)$_6$$^{3-}$/Fe(CN)$_6$$^{4-}$] redox-active electrolyte (RE). The macroporous structure of the LSAC may allow easy access of the RE ions to the surface of activated carbon particles and enable fast and reversible redox reactions as well as fast absorption and desorption as illustrated in FIG. 6A. FIG. 6A illustrates the charge storage mechanism in LSAC electrode using 1.0 M Na$_2$SO$_4$ electrolyte (1) in the absence, and (2) in the presence of redox additive. Therefore, the combination of 0.1 M RE electrolyte with the LSAC electrodes may be expected to not only boost the energy and power but also stabilize the cycle life, allowing the operation of the device at a high voltage of 2.0 V. It is also interesting to note that the exemplary 0.1 M RE system shows an ideal CV profile with a rectangular shape and distinct redox peaks, whereas an exemplary ACN electrolyte system shows EDLC properties only as expected, as shown in FIG. 6B. FIG. 6B provides exemplary CV profiles comparing the electrochemical performance of activated carbon electrodes before and after laser scribing tested in traditional 1.0 M in acetonitrile and in 0.1 M redox electrolyte, data collected at a scan rate of 50 mV s$^{-1}$. Furthermore, compared with exemplary 0.1 M RE with non-scribed activated electrodes, the exemplary 0.1 M RE-LSAC system shows about a 30% increase in the area of the CV. This may suggest that the combination of an LSAC electrode with an RE can increase the capacitance through the porous architecture of the electrode to allow better exposure of the active materials to the RE ions. Again, both the CV and CC measurements are collected at an increasing voltage window up to 2 V, at a scan rate of 50 mV s$^{-1}$ for the CV curves and at a current density of 11.3 mA cm$^{-2}$ for the CC curves as shown in FIGS. 9A and 9B.

Figure 6F:
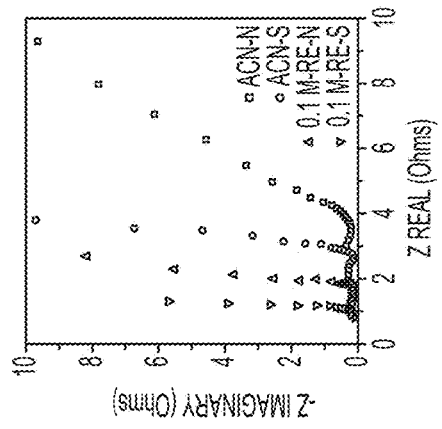
FIG. 6F are Nyquist plots comparing the performance of four different cases.
Figure 6E:
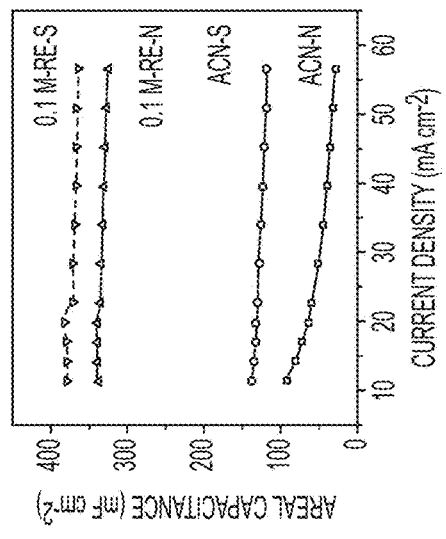
FIG. 6E shows the Areal capacitance vs. current density of four different cases.
Figure 6D:
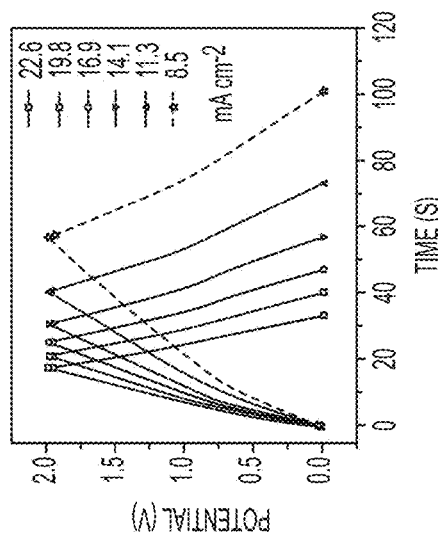
FIG. 6D shows the CC curves corresponding to FIG. 6C at different current densities 8.5, 11.3, 14.1, 16.9, 19.8, 22.6 mA cm$^{-2}$.
Figure 9C:
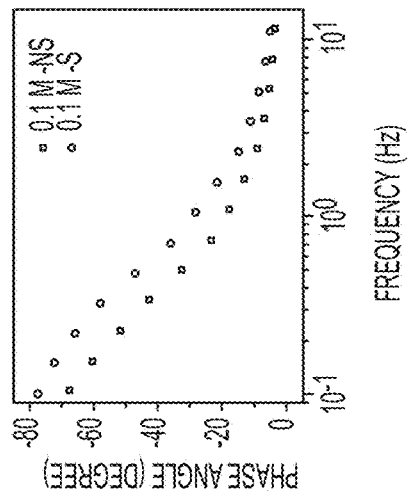
FIG. 9C shows CV curves of LSAC in a redox-active electrolyte at high scan rates of 500, 700, and 1000 mVs$^{-1}$.
Figure 9A:
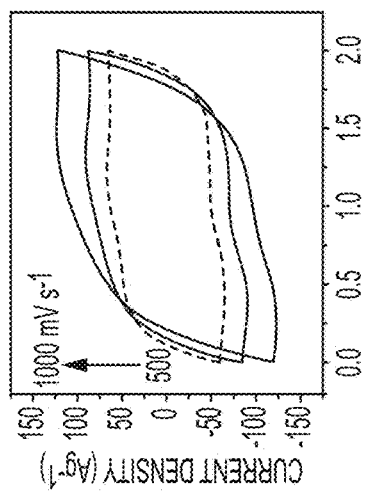
FIG. 9A shows the CV curves of LSAC in a redox-active electrolyte at 50 mV s$^{-1}$.
Figure 9B:
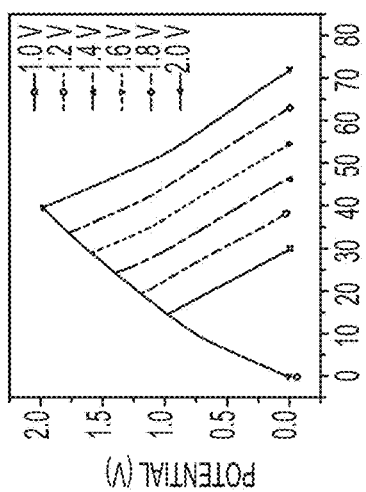
FIG. 9B provides the galvanostatic charge/discharge (CC) curves of LSAC in a redox-active electrolyte at a current density of 11.3 mA cm$^{-2}$ at an increasing voltage window from 1.0 V to 2 V.
Figure 9E:
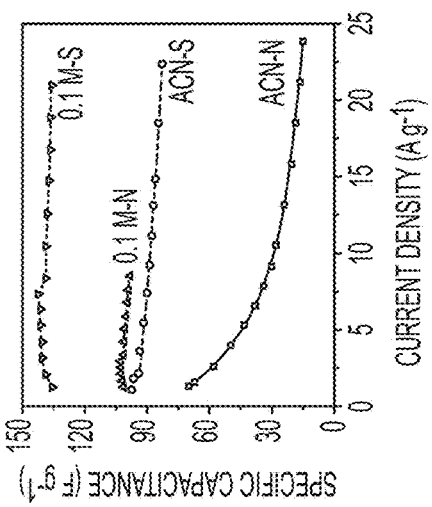
FIG. 9E provides the comparison of gravimetric capacitance per electrode for activated carbon before and after laser scribing, with and without redox electrolyte, normalized by active materials (activated carbon+0.1 M RE).
Figure 9D:
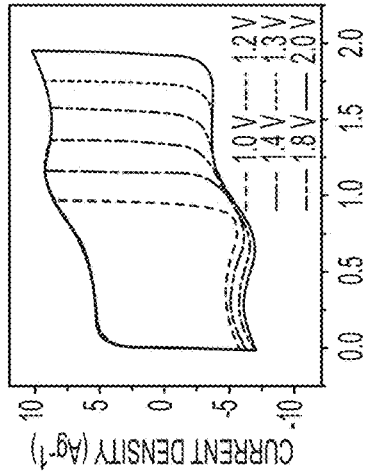
FIG. 9D shows the CC curves of LSAC in a redox-active electrolyte at various current densities of 28.2, 33.9, 39.5, 45.2, 50.8, and 56.5 mAcm$^{-2}$.

In some embodiments, the supercapacitor hybrid of the exemplary 0.1 M RE-LSAC is tested over a wide range of scan rates from 30 to 1000 mV s$^{-1}$, as shown in FIG. 6C and FIG. 9C, and current densities 8.5 to 56.5 mA cm$^{-2}$, as shown in FIG. 6D and FIG. 9D. This exemplary hybrid system exhibits redox peaks up to a high scan rate 1000 mV s$^{-1}$, which may indicate excellent charge storage through ultrafast redox reactions. Change of the areal capacitances as shown in FIG. 6E, and gravimetric capacitances as shown in FIG. 9E of all four systems as a function of the current density were calculated for comparison. Not only did the exemplary ACN with non-scribed electrode system show a lower capacitance, but also its capacitance rapidly dropped at higher charge-discharge rates. Nevertheless, no significant changes can be observed in the capacitance of the exemplary hybrid system at high rates. In order to get a glimpse of the difference between the two cases, the capacitance of the two exemplary devices were compared at a relatively high current density of 56.5 mA cm$^{-2}$. The exemplary hybrid system can deliver 364.6 mF/cm$^{-2}$, which is 13 times greater than the capacitance of a traditional supercapacitor using non-scribed activated carbon electrodes and an acetonitrile-based electrolyte (28 mF cm$^{-2}$). Again, this may confirm the improved ion diffusion kinetics within the laser scribed electrodes and the excellent faradaic capacitance contribution of the redox electrolyte.

Figure 9F:
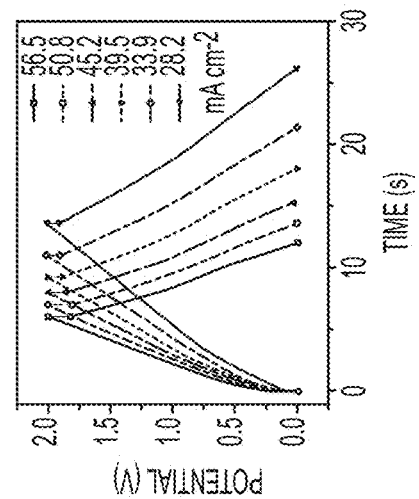
FIG. 9F are bode plots of the redox electrolyte-based supercapacitors before and after laser scribing (i.e. RE-AC and RE-LSAC).

The superior synergetic interaction between the exemplary laser scribed macroporous electrodes and the 0.1 M RE is further confirmed from electrochemical impedance spectroscopy measurements, showing low ESR of 0.9Ω as shown in FIG. 6F and a short response time of 1.96 s as shown in FIG. 9F, compared with 1.61Ω and 3.33 s for a supercapacitor consisting of exemplary non-scribed AC electrode and 0.1 M RE and 2.6Ω and 2.07 s for a supercapacitor consisting of laser scribed AC electrodes without redox additive (not shown). Apparently, the laser scribed electrodes may work together with the redox additive towards improving both the ESR of the cell and the response time, which is consistent with the exemplary CV and CC results.

The exemplary 0.1 M RE-LSAC system shows excellent performance in the Ragone plot, compared with commercially available energy storage devices, as shown in FIG. 6G. This Ragone plot is normalized based on the volume of the full device that includes the active material, current collector, separator, and electrolyte. The exemplary 0.1 M RE-LSAC supercapacitor can demonstrate a volumetric energy density of 6.2 mWh cm$^{-3}$, which is about 9 times higher than a commercially available activated carbon electrochemical capacitor with an ACN electrolyte. Furthermore, the exemplary 0.1 M RE-LSAC can deliver ultrahigh power densities up to 3.6 W cm$^{-3}$, which is about 700 times faster than a lithium thin-film battery. Therefore, the exemplary LSAC electrode in combination with a 0.1 M RE may be a perfect candidate for the future energy storage application.

Another Ragone plot based on the total mass of the active materials (Activated carbon and RE electrolyte) was made to compare with previously published RE-based electrolyte supercapacitors as shown in FIG. 6I. When compared to other published data, the supercapacitors lie in the upper-right side of the plot, meaning that both the power and the energy densities are outstanding. Even at a very high power density of 11.5 kW kg$^{-1}$, the exemplary 0.1 M RE-LSAC maintains 95% of its original energy density at low rates (18.9 Wh kg$^{-1}$). Since the redox electrolyte may contribute to charge storage just like the active electrode material, the mass of the electrolyte is also considered in the calculations. Here, the specific power achieved by the exemplary 0.1 M RE-LSAC supercapacitor is 11,516 W kg$^{-1}$, which is 70 times larger than previous reports of RE-EC.

Table 1 provides a summary of the electrochemical data for previously published redox supercapacitors with aqueous electrolyte, data indicate that the exemplary hybrid 0.1 M RE-LSAC system show higher voltage window as well.

TABLE 1

Comparison of the voltage window of 0.1M redox-active electrolyte (RE) with the exemplary laser scribed activated carbon electrode (LSAC) with other published article using aqueous based redox-active electrolyte

| Redox Couple | Based Electrolyte | Voltage |
| --- | --- | --- |
| 0.1M Potassium ferrocyanide (FeCN$_6^{3+}$/FeCN$_6^{4+}$) | 1M Na$_2$SO$_4$ | 2 V |
| 0.38M hydroquinone (Q/HQ) | 1M H$_2$SO$_4$ | 1 V |
| 0.3 g VOSO$_4$ (VO$^{2+}$/VO$_2^+$) | 1M H$_2$SO$_4$ | 0.8 V |
| 0.050 g p-phenylenediamine (p-phenylenediamine/p-phenylenediimine) | 2M KOH | 1 V |
| 0.08M KI (I$^-$/I$_3^-$) | 1M H$_2$SO$_4$ | 1 V |
| 0.08M KI (I$^-$/I$_3^-$) | 1M Na$_2$SO$_4$ | 1 V |
| 0.08M KBr (Br$^-$/Br$_3^-$) | 1M H$_2$SO$_4$ | 1 V |
| 0.06M CuCl$_2$ (Cu$^{2+}$/Cu) | 1M HNO$_3$ | 1.35 V |
| 0.4M hydroquinone (Q/HQ) | 1M H$_2$SO$_4$ | 0.8 V |
| 0.4M CuSO$_4$ (Cu$^{2+}$/Cu) | 1M H$_2$SO$_4$ | 0.8 V |
| 1M KI and 1M VOSO$_4$ (I$^-$/I$_3^-$ and VO$^{2+}$/VO$_2^+$) | | 0.8 V |
| 0.4M KBr/0.1M HVBr$_2$ (Br$^-$/Br$_3^-$ and HV$^{2+}$/HV$^+$) | | 1.2 V |
| 1M KBr/0.5M MVCl$_2$ (Br$^-$/Br$_3^-$ and MV$^{2+}$/MV$^+$) | | 1.4 V |

Good cycling life is one of the fundamental properties of supercapacitors. FIG. 6I shows the cycle life of the exemplary 0.1 M RE-LSAC supercapacitor during charging and discharging at a current density 30 mA cm$^{-2}$ for 7000 cycles. Compared with a supercapacitor utilizing 1.0 M Na$_2$SO$_4$, which loses most of its capacitance in the first 10 cycles, the exemplary 0.1 M RE-LSAC supercapacitor maintains 80% of its original capacity after 7000 cycles at 2.0 V. This outstanding electrochemical stability can be attributed to the redox-electrolyte that not only adds faradaic capacitance to the cell but also stabilizes the cycle life of the cell even at an ultrahigh voltage of 2.0 V. These results confirm the synergy between the macroporous activated carbon electrode formed by laser scribing and the redox electrolyte through improved ion migration and fast and reversible redox reactions. The microscale channels may act as electrolyte reservoirs and may tend to reduce the internal resistance and increase the capacitance simultaneously.

In one aspect, the present disclosure provides processes, methods, protocols etc. for manufacturing carbon-based electrodes for use in high energy storage devices such as supercapacitors. In some embodiments, the processes, methods, and/or protocols increase the capacitance of the carbon electrodes. In certain embodiments, the increase capacitance of the carbon electrodes reduces the cost of storing energy in high energy devices using the carbon electrodes such as supercapacitors.

In some embodiments, the carbon-based electrodes comprise carbon-coated current collectors. In further embodiments, the methods comprise laser irradiation of carbon-based electrodes. In some embodiments, the laser irradiation of carbon-based electrodes can be performed using standard laser cutting tools that are widely utilized in industry.

In some embodiments, the laser-irradiation of the carbon-coated electrodes forms micro-channels in the electrodes. The micro-channels can store electrolytes for effective charge and discharge. The micro-channels may reduce the distance over which the ions have to move during the processes of charge and discharge.

In some embodiments, the method comprises receiving a carbon substrate; casting the carbon substrate on a current collector; generating a light beam having a power density to generate one or more micro-channels in the carbon substrate; and creating an activated carbon-based electrode with one or more micro-channels.

In other embodiments, the method further comprises a light beam with a power of about 7 W. In some embodiments, the method comprises a light beam with a power of no greater than about 40 W. In other embodiments, the method comprises a light beam with a power of no less than about 1 W.

In some embodiments, the carbon substrate comprises carbon cloth, carbon fiber, glassy carbon, carbon nanofoam, carbon aerogel, or combinations thereof. In some embodiments, the carbon substrate is carbon cloth.

In some embodiments, the current collector is metallic. In some embodiments, the current collector comprises aluminum, nickel, copper, platinum, steel, or combinations thereof. In certain embodiments, the current collector comprises aluminum.

In some embodiments, the one or more micro-channels have a pore size from about 50 nanometers to about 500 micrometers. In some embodiments, the pore size is at least about 50 nanometers. In some embodiments, the pore size is at most about 500 micrometers. In some embodiments, the one or more channels have a pore size of about 100 micrometers. In some embodiments, the one or more channels have a pore size of at least about 100 micrometers. In some embodiments, the one or more channels have a pore size of at most about 100 micrometers.

In some embodiments, the LSAC electrode can have an areal capacitance of about 50 mF/cm$^2$ to about 800 mF/cm$^2$. In some embodiments, the LSAC electrode can have an areal capacitance of about 50 mF/cm$^2$. In some embodiments, the LSAC electrode can have an areal capacitance of about 800 mF/cm$^2$.

In some embodiments, the LSAC electrode can have a gravimetric capacitance of about 80 F/g to about 150 F/g. In some embodiments, the LSAC electrode can have a gravimetric capacitance of at least about 80 F/g. In some embodiments, the LSAC electrode can have a gravimetric capacitance of at most about 150 F/g.

In some embodiments, the LSAC electrode can have a packing density of about 0.1 g/cm$^3$ to about 1.0 g/cm$^3$. In some embodiments, the LSAC electrode can have a packing density of at least about 0.5 g/cm$^3$. In some embodiments, the LSAC electrode can have a packing density of about 0.6 g/cm$^3$.

In an exemplary embodiment, activated carbon electrodes are prepared by making a slurry consisting of activated carbon, a 1:1 ratio of carboxymethyl cellulose/styrene-butadiene rubber, as a binder, and a solution of carbon black in deionized water with a weight ratio of 80:10:10, respectively. The slurry may then be cast on a carbon coated aluminum foil using a doctor blade method. This film may then be dried for 12 hours under ambient conditions. The dried film may then be exposed to a 7-W $CO_2$ laser to synthesize laser-scribed activated carbon (LSAC) film.

In an exemplary embodiment, LSAC electrodes are assembled in a standard CR2032 coin cell using electrode discs of about 15 mm in diameter and Celgard 3501 polymer separators. The coin cells may be assembled in air. The loading masses of the exemplary activated carbon film before and after scribing are 3.9 and 3.2 mg/cm$^2$, respectively.

In some exemplary embodiments, the LSAC-supercapacitor comprises an aqueous electrolyte. In some embodiments, the aqueous electrolyte comprises tetraethylammonium tetrafluoroborate ($TEABF_4$) in acetonitrile (ACN). In further embodiments, the aqueous electrolyte comprises 1.0 M tetraethylammonium tetrafluoroborate ($TEABF_4$) in acetonitrile (ACN). In other embodiments, the aqueous electrolyte comprises [$Fe(CN)_6^{3-}$/$Fe(CN)_6^{4-}$]. In further embodiments, the aqueous electrolyte comprises [$Fe(CN)_6^{3-}$/$Fe(CN)_6^{4-}$] in an $Na_2SO_4$ solution.

In some embodiments, the supercapacitor can be assembled without any special dry rooms or glove boxes.

In another aspect, the present disclosure provides processes, methods, protocols for manufacturing high energy storage devices such as supercapacitors comprising redox active electrolytes. In some embodiments, the supercapacitors comprise one or more of the redox active electrolytes listed in Table 1. In some embodiments, the use of redox active electrolytes increases the capacitance of the high energy storage devices. In certain embodiments, the increase in the capacitance of the high energy storage devices reduces the cost of the high energy storage device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Terms and Definitions

As used herein, the term "about" or "approximately" refers to an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 10%, 9%, 8%, 7%, 6%, 5%, 4%, 3%, 2%, 1%, 0.5%, or 0.05% of a given value or range.

As used herein, the term "channel" refers to a gutter, groove, or furrow.

What is claimed is:

1. An electrode comprising a current collector and an activated carbon substrate comprising activated carbon cloth, wherein the activated carbon substrate comprises one or more laser scribed channels having a size of about 0.05 micrometers (μm) to about 100 μm.

2. The electrode of claim 1, wherein the current collector comprises aluminum, nickel, copper, platinum, iron, steel, graphite, carbon cloth, or any combination thereof.

3. The electrode of claim 1, wherein the one or more laser scribed channels have a pore size of from about 5 μm to about 100 μm.

4. The electrode of claim 1, wherein the electrode has an areal capacitance of at least about 50 mF/cm$^2$.

5. The electrode of claim 1, wherein the electrode has a gravimetric capacitance of at least 80 F/g.

6. The electrode of claim 1, wherein the electrode has a packing density of at least about 0.1 g/cm$^3$.

7. A supercapacitor comprising:
   a) a first electrode;
   b) a second electrode; and
   c) an electrolyte;
   wherein at least one of the first electrode and the second electrode comprises a current collector and an activated carbon substrate, and wherein the activated carbon substrate comprises one or more laser scribed channels having a size of about 0.05 μm to about 100 μm.

8. The supercapacitor of claim 7, wherein the activated carbon substrate comprises activated carbon, activated charcoal, activated carbon cloth, activated carbon fiber, activated glassy carbon, activated carbon nanofoam, activated carbon aerogel, or combinations thereof.

9. The supercapacitor of claim 7, wherein the current collector comprises aluminum, nickel, copper, platinum, iron, steel, graphite, carbon cloth, or combinations thereof.

10. The supercapacitor of claim 7, wherein the one or more laser scribed channels have a pore size of from about 5 μm to about 100 μm.

11. The supercapacitor of claim 7, wherein the electrolyte comprises an oxidizing agent, a reducing agent, and an aqueous solution, and wherein the oxidizing agent and the reducing agent comprise a redox couple.

12. The supercapacitor of claim 11, wherein the redox couple comprises $Fe(CN)_6^{3-}/Fe(CN)_6^{4-}$ with a concentration of about 0.01 M to 1.0 M.

13. The supercapacitor of claim 11, wherein the aqueous solution comprises $Na_2SO_4$.

14. The supercapacitor of claim 7, wherein the electrolyte comprises 1-Allyl-3-methylimidazolium bis(trifluoromethylsulfonyl)imide, 1-Ethyl-3-methylimidazolium tetrafluoroborate, 1-Butyl-3-methylimidazolium tetrafluoroborate, 1-Hexyl-3-methylimidazolium bis(trifluormethylsulfonyl)imide, 1-Butyl-3-methylimidazolium trifluoromethanesulfonate, 1-Ethyl-3-methylimidazolium 1,1,2,2-tetrafluoroethanesulfonate, 1-Ethyl-3-methylimidazolium trifluoromethanesulfonate, 1-Ethyl-3-methylimidazolium diethyl phosphate, acetonitrile, or any combination thereof.

15. The supercapacitor of claim 7, having an areal capacitance of from about 360 mF/cm$^2$ to about 380 mF/cm$^2$.

16. The supercapacitor of claim 7, having a power density of from about 1 W/cm$^3$ to about 6 W/cm$^3$.

17. The supercapacitor of claim 7, having a gravimetric energy density of from about 18 Wh/kg to about 21 Wh/kg.

18. The supercapacitor of claim 7, having a power density of from about 3,000 W/kg to about 12,000 W/kg.

* * * * *